US012292023B2

(12) United States Patent
Ohata

(10) Patent No.: US 12,292,023 B2
(45) Date of Patent: May 6, 2025

(54) CONTROL DEVICE FOR INTERNAL COMBUSTION ENGINE

(71) Applicant: Hitachi Astemo, Ltd., Hitachinaka (JP)

(72) Inventor: Eiichiro Ohata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/597,080

(22) PCT Filed: Jun. 16, 2020

(86) PCT No.: PCT/JP2020/023521
§ 371 (c)(1),
(2) Date: Dec. 23, 2021

(87) PCT Pub. No.: WO2020/262098
PCT Pub. Date: Dec. 30, 2020

(65) Prior Publication Data
US 2022/0316436 A1  Oct. 6, 2022

(30) Foreign Application Priority Data
Jun. 26, 2019 (JP) ................. 2019-118841

(51) Int. Cl.
F02P 9/00 (2006.01)
F02P 3/04 (2006.01)
F02P 3/05 (2006.01)
(52) U.S. Cl.
CPC ............. *F02P 9/007* (2013.01); *F02P 3/0442* (2013.01); *F02P 3/05* (2013.01)
(58) Field of Classification Search
CPC .. F02P 3/0442; F02P 3/05; F02P 9/007; F02P 3/051; F02P 3/0552
(Continued)

(56) References Cited

U.S. PATENT DOCUMENTS 4,641,626 A     2/1987  Morino et al.
6,131,555 A  *  10/2000 Tozzi ................. F02P 3/053
                                                     123/623

(Continued)

FOREIGN PATENT DOCUMENTS

JP   61-129466 A    6/1986
JP   2001-159367 A  6/2001
(Continued)

OTHER PUBLICATIONS

International Search Report (PCT/ISA/210) issued in PCT Application No. PCT/JP2020/023521 dated Aug. 25, 2020 with English translation (six (6) pages).

(Continued)

*Primary Examiner* — Logan M Kraft
*Assistant Examiner* — Joshua Campbell
(74) *Attorney, Agent, or Firm* — Crowell & Moring LLP

(57) ABSTRACT

Failure in ignition of a fuel by an ignition plug is reduced, and, at the same time, wearing of electrodes of the ignition plug in an internal combustion engine is suppressed. A control device 1 for an internal combustion engine includes an ignition control unit that controls energization of an ignition coil 300 that supplies electric energy to an ignition plug 200 that discharges in a cylinder 150 of the internal combustion engine 100 to ignite fuel. The ignition control unit controls the energization of the ignition coil 300 such that first electric energy is released from the ignition coil 300 and second electric energy is released in superposition with the first electric energy. At this time, the energization of the ignition coil 300 is controlled such that releasing of the second electric energy is stopped at a timing that depends on a state of gas around the ignition plug 200 so that the discharge of the ignition plug 200 is stopped.

8 Claims, 15 Drawing Sheets

(58) Field of Classification Search
USPC .................................. 123/634, 605, 649–654
See application file for complete search history.

(56) References Cited

U.S. PATENT DOCUMENTS

| | | | |
|---|---|---|---|
| 2001/0002591 | A1 | 6/2001 | Majima |
| 2016/0084213 | A1 | 3/2016 | Nakayama et al. |
| 2017/0037826 | A1* | 2/2017 | Nakayama ................ F02P 3/05 |
| 2017/0058854 | A1 | 3/2017 | Nakamura et al. |
| 2018/0358782 | A1* | 12/2018 | Miyake .................. F02P 7/077 |
| 2020/0049120 | A1 | 2/2020 | Ohno |

FOREIGN PATENT DOCUMENTS

| | | | | |
|---|---|---|---|---|
| JP | 2015-14237 | A | | 1/2015 |
| JP | 2015014237 | A * | 1/2015 | ............. F02P 15/10 |
| JP | 2016-53314 | A | | 4/2016 |
| JP | 2017-48713 | A | | 3/2017 |
| JP | 6375452 | B2 | | 8/2018 |
| WO | WO-2016157541 | A1 * | 10/2016 | ............... F02P 3/00 |
| WO | WO 2018/131407 | A1 | | 7/2018 |
| WO | WO 2018/193909 | A1 | | 10/2018 |

OTHER PUBLICATIONS

Japanese-language Written Opinion (PCT/ISA/237) issued in PCT Application No. PCT/JP2020/023521 dated Aug. 25, 2020 (four (4) pages).
Japanese-language Office Action issued in Japanese Application No. 2023-071167 dated Jan. 23, 2024 with English translation (8 pages).

\* cited by examiner

FIG. 4
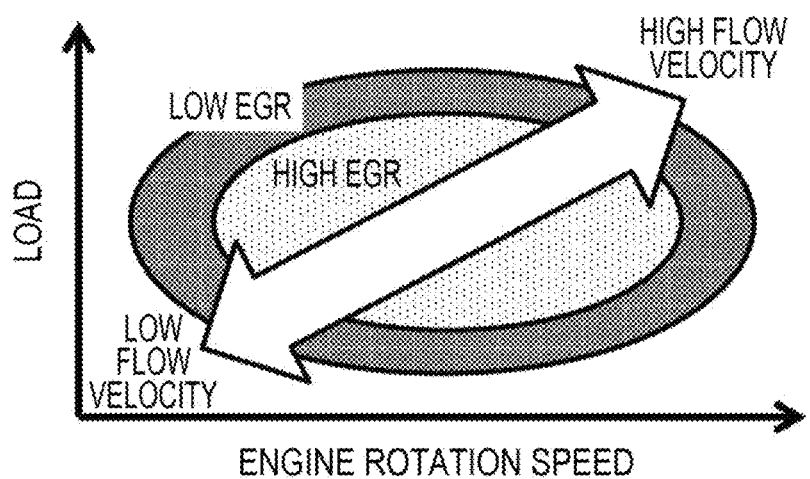
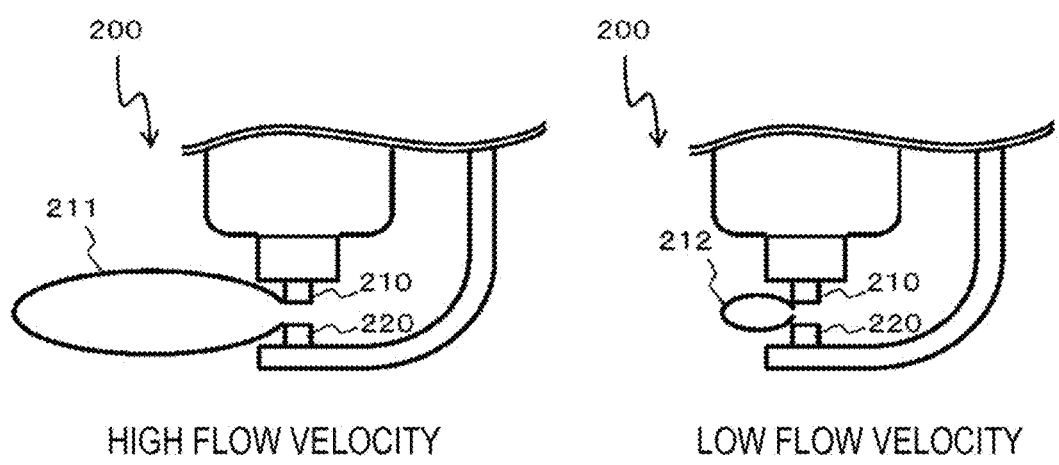
FIG. 5A  
FIG. 5B

CONTROL DEVICE FOR INTERNAL COMBUSTION ENGINE

TECHNICAL FIELD

The present invention relates to a control device for an internal combustion engine.

BACKGROUND ART

In recent years, in order to improve the fuel efficiency of vehicles, there has been developed a control device for an internal combustion engine in which the following techniques and the like are introduced: techniques for operating the internal combustion engine by burning an air-fuel mixture thinner than a theoretical air-fuel ratio; and techniques for taking in a part of an exhaust gas after combustion and intaking the exhaust gas again.

In this type of control device for an internal combustion engine, since the amount of fuel or air in a combustion chamber deviates from a theoretical value, a failure in ignition of the fuel by an ignition plug tends to occur. To address this issue, there is a method of suppressing misfire. In the method, a gas flow velocity in the combustion chamber is increased so that a flow velocity in a space between electrodes of the ignition plug is increased to form a longer discharge path, so that a contact length between the discharge path and the gas is lengthen.

However, when the flow velocity in the space between the electrodes of the ignition plug is made high, the frequency of occurrence of blowing out of the discharge path and re-discharge associated with the blowing out is increased. At the time of re-discharge, dielectric breakdown due to a capacitive discharge occurs. Since a current density of the capacitive discharge is high, the electrodes are melted due to the high current, and wearing of the electrodes is accelerated.

In order to reduce the frequency of occurrence of the capacitive discharge and to suppress wearing of the electrodes of the ignition plug, it is necessary to maintain the discharge path for as long time as possible by continuously supplying a sufficient amount of current after the discharge path is formed. However, since an energy inside an ignition coil is, in general, continuously decreasing with time from the start of discharge, it gradually becomes unable to supply a current necessary to maintain the discharge path.

As a result, there arises a problem that the discharge path fails to be maintained in the course of the combustion of the gas and re-discharge is required.

PTL 1 discloses a control device for an internal combustion engine in which an ignition coil having a main primary coil and a sub-primary coil is used and in which a discharge spark is generated in an ignition plug by the main primary coil, and then a current is superposed by the sub-primary coil until elapse of a superposed current supply time that is determined in consideration of a time necessary and sufficient for the ignition plug to discharge.

CITATION LIST

Patent Literature

PTL 1: JP 6375452 B2

SUMMARY OF INVENTION

Technical Problem

In the techniques disclosed in PTL 1, since the superposed current supply time is constant regardless of a state of combustion, the superposed current supply time cannot be appropriately adjusted depending on the cycle fluctuation of the internal combustion engine. In order to be able to cope with the cycle fluctuation, it is necessary to set the superposed current supply time including an excessive margin. However, when the superposed current supply time is set in this way, there flows a superposed current larger than the amount necessary to maintain the discharge path, and there arise problems such as heat generation in the ignition coil, wearing of the ignition plug electrodes, and a decrease in energy efficiency. To the contrary, when the margin of the superposed current supply time is reduced, the energy inside the ignition coil is accordingly reduced, and there is a possibility that the discharge path cannot be maintained.

Therefore, the present invention has been made in view of the above problems, and an object of the present invention is to suppress wearing of electrodes of an ignition plug in an internal combustion engine while reducing failure in ignition of a gas by the ignition plug.

Solution to Problem

A control device for an internal combustion engine according to the present invention includes: an ignition control unit that controls energization of an ignition coil that supplies electric energy to an ignition plug that discharges in a cylinder of the internal combustion engine to ignite fuel. The ignition control unit controls the energization of the ignition coil such that the ignition coil releases first electric energy and, in addition, releases second electric energy in superposition with the first electric energy, and controls the energization of the ignition coil such that the ignition coil stops the releasing of the second electric energy at a timing depending on a state of a gas around the ignition plug to stop the discharge of the ignition plug.

Advantageous Effects of Invention

The present invention makes it possible to suppress electrode wearing of an ignition plug in an internal combustion engine while reducing failure in ignition of a gas by the ignition plug.

BRIEF DESCRIPTION OF DRAWINGS

FIG. 4 is a diagram illustrating a relationship between an operating state of the internal combustion engine and a gas flow velocity around the ignition plug.

FIGS. 5A and 5B are diagrams illustrating a relationship between a discharge path and a flow velocity in a space between electrodes of the ignition plug.

DESCRIPTION OF EMBODIMENTS

Hereinafter, a control device for an internal combustion engine according to an embodiment of the present invention will be described.

Hereinafter, a description will be given of a control device 1 that is an aspect of a control device for an internal combustion engine according to one embodiment of the present invention. In the present embodiment, a case where the control device 1 controls discharge (ignition) of an ignition plug 200 provided in each of cylinders 150 of a four-cylinder internal combustion engine 100 will be described as an example.

Hereinafter, in the embodiments, a combination of a part or all of the configuration of the internal combustion engine 100 and a part or all of the configuration of the control device 1 is referred to as a control device 1 of the internal combustion engine 100.

[Internal Combustion Engine]

Figure 1:
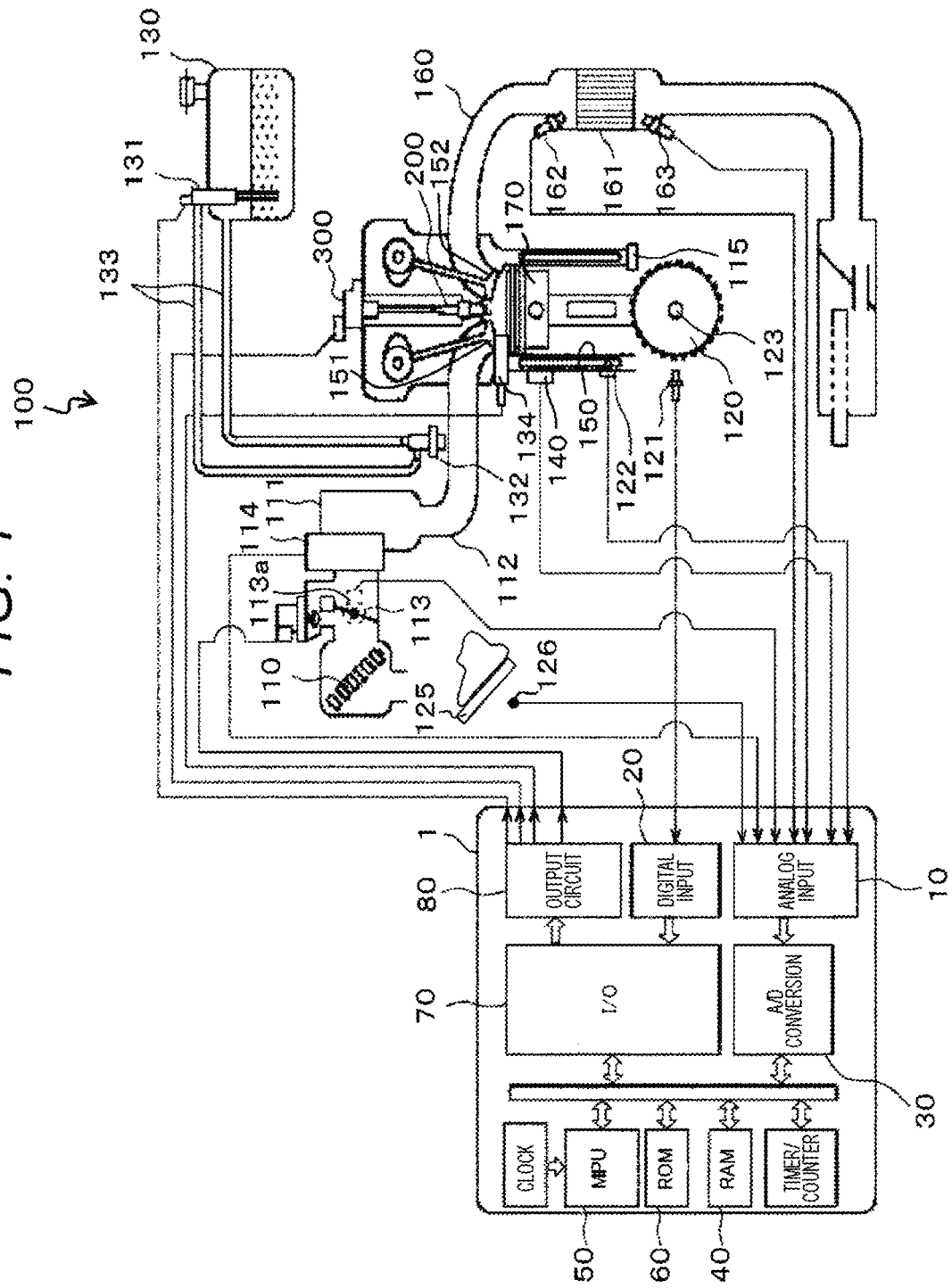
FIG. 1 is a diagram illustrating a configuration of main parts of an internal combustion engine and a control device for the internal combustion engine according to an embodiment.

FIG. 1 is a diagram for describing a configuration of main parts of the internal combustion engine 100 and an ignition device for an internal combustion engine.

Figure 2:
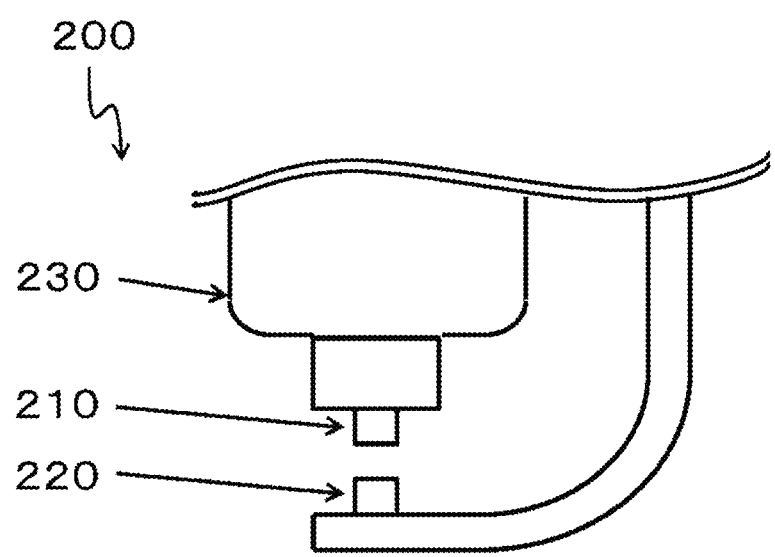
FIG. 2 is a partially enlarged view illustrating an ignition plug.

FIG. 2 is a partially enlarged view illustrating electrodes 210 and 220 of the ignition plug 200.

In the internal combustion engine 100, the air taken in from the outside flows through an air cleaner 110, an intake pipe 111, and an intake manifold 112, and when an intake valve 151 is opened, the air flows into each cylinder 150. The amount of air flowing into each cylinder 150 is adjusted by a throttle valve 113, and the amount of air adjusted by the throttle valve 113 is measured by a flow sensor 114.

The throttle valve 113 is provided with a throttle opening sensor 113a that detects a degree of opening of a throttle. Information of the degree of opening of the throttle valve 113 detected by the throttle opening sensor 113a is output to the control device (electronic control unit: ECU) 1.

Note that an electronic throttle valve driven by an electric motor is used as the throttle valve 113, but other methods may be used as long as the flow rate of air can be appropriately adjusted.

A temperature of the gas flowing into each cylinder 150 is detected by an intake air temperature sensor 115.

A crank angle sensor 121 is provided radially outside a ring gear 120 attached to a crankshaft 123. The crank angle sensor 121 detects a rotation angle of the crankshaft 123. In the embodiment, the crank angle sensor 121 detects the rotation angle of the crankshaft 123, for example, every 10° and every combustion cycle.

A water temperature sensor 122 is provided in a water jacket (not shown) of a cylinder head. A temperature of cooling water of the internal combustion engine 100 is detected by the water temperature sensor 122.

In addition, a vehicle is provided with an accelerator position sensor (APS) 126 that detects an amount of displacement (step-on amount) of an accelerator pedal 125. The accelerator position sensor 126 detects a driver's required torque. The driver's required torque detected by the accelerator position sensor 126 is output to the control device 1 to be described later. The control device 1 controls the throttle valve 113 on the basis of the required torque.

Fuel stored in a fuel tank 130 is drawn and pressurized by a fuel pump 131, then flows through a fuel pipe 133 provided with a pressure regulator 132, and is guided to a fuel injection valve (injector) 134. The fuel having been output from the fuel pump 131 is adjusted to a predetermined pressure by the pressure regulator 132, and is injected into each cylinder 150 from the fuel injection valve (injector) 134. As a result of the pressure adjustment by the pressure regulator 132, excessive fuel is returned to the fuel tank 130 through a return pipe (not shown).

The cylinder head (not shown) of the internal combustion engine 100 is provided with combustion pressure sensors (each also referred to as a cylinder pressure sensor: CPS) 140. The combustion pressure sensors 140 are provided in cylinders 150 in one-to-one correspondence and detect the pressures (combustion pressure) in the cylinders 150.

As the combustion pressure sensors 140, piezoelectric or gauge pressure sensors are used, and the combustion pressure (cylinder pressure) in each cylinder 150 can be detected over a wide temperature range.

An exhaust valve 152 and an exhaust manifold 160 that discharges a gas after combustion (exhaust gas) to the outside of the cylinder 150 are attached to each cylinder 150. A three-way catalyst 161 is provided on the exhaust side of the exhaust manifold 160. When the exhaust valve 152 is opened, the exhaust gas is released from the cylinder 150 to the exhaust manifold 160. The exhaust gas passes through the exhaust manifold 160, is purified by the three-way catalyst 161, and is then released to the atmosphere.

An upstream air-fuel ratio sensor 162 is provided on the upstream side of the three-way catalyst 161. The upstream air-fuel ratio sensor 162 continuously detects an air-fuel ratio of the exhaust gas released from each cylinder 150.

A downstream air-fuel ratio sensor 163 is provided on the downstream side of the three-way catalyst 161. The downstream air-fuel ratio sensor 163 outputs a switch-like detection signal in the vicinity of a theoretical air-fuel ratio. In the embodiments, the downstream air-fuel ratio sensor 163 is, for example, an 02 sensor.

The ignition plug 200 is provided on an upper part of each cylinder 150. Due to discharge (ignition) of the ignition plug 200, a spark ignites an air-fuel mixture in the cylinder 150 to cause an explosion in the cylinder 150, and a piston 170 is pushed down. When the piston 170 is pushed down, the crankshaft 123 rotates.

An ignition coil 300 that generates electric energy (voltage) to be supplied to the ignition plug 200 is connected to the ignition plug 200. The voltage generated by the ignition coil 300 causes discharge between a center electrode 210 and an outer electrode 220 of the ignition plug 200 (see FIG. 2).

As illustrated in FIG. 2, in the ignition plug 200, the center electrode 210 is supported in an insulated state by an insulator 230. A predetermined voltage (for example, 20,000 V to 40,000 V in the embodiment) is applied to the center electrode 210.

The outer electrode 220 is grounded. When the predetermined voltage is applied to the center electrode 210, discharge (ignition) occurs between the center electrode 210 and the outer electrode 220.

In the ignition plug 200, a voltage at which discharge (ignition) occurs due to dielectric breakdown of a gas component fluctuates depending on a state of gas between the center electrode 210 and the outer electrode 220 and the cylinder pressure. The voltage at which this discharge occurs is referred to as a dielectric breakdown voltage.

Discharge control (ignition control) of the ignition plug 200 is performed by an ignition control unit 83 of the control device 1 to be described later.

With reference again to FIG. 1, output signals from various sensors such as the throttle opening sensor 113a, the flow sensor 114, the crank angle sensor 121, the accelerator position sensor 126, the water temperature sensor 122, and the combustion pressure sensors 140 described above are output to the control device 1. The control device 1 detects an operating state of the internal combustion engine 100 on the basis of the output signals from these various sensors, and controls the amount of air delivered into the cylinder 150, the injection amount of fuel, an ignition timing of the ignition plug 200, and the like.

[Hardware Configuration of Control Device]

Next, an overall configuration of hardware of the control device 1 will be described.

As illustrated in FIG. 1, the control device 1 includes an analog input unit 10, a digital input unit 20, an analog/digital (A/D) converter 30, a random access memory (RAM) 40, a micro-processing unit (MPU) 50, a read-only memory (ROM) 60, an input/output (I/O) port 70, and an output circuit 80.

The analog input unit 10 receives analog output signals from various sensors such as the throttle opening sensor 113a, the flow sensor 114, the accelerator position sensor 126, the upstream air-fuel ratio sensor 162, the downstream air-fuel ratio sensor 163, the combustion pressure sensors 140, and the water temperature sensor 122.

The A/D converter 30 is connected to the analog input unit 10. The analog output signals from the various sensors having been input to the analog input unit 10 are subjected to signal processing such as noise reduction, are then converted into digital signals by the A/D converter 30, and are stored in the RAM 40.

The digital output signal from the crank angle sensor 121 is input to the digital input unit 20.

An I/O port 70 is connected to the digital input unit 20, and the digital output signal having been input to the digital input unit 20 is stored in the RAM 40 via the I/O port 70.

Each output signal stored in the RAM 40 is subjected to arithmetic processing by the MPU 50.

The MPU 50 executes a control program (not shown) stored in the ROM 60 and thereby performs, according to the control program, arithmetic processing on the output signals stored in the RAM 40. The MPU 50 calculates control values that define operation amounts of the actuators (such as the throttle valve 113, the pressure regulator 132, and the ignition plug 200) that drive the internal combustion engine 100 according to the control program, and the MPU 50 temporarily stores the control values in the RAM 40.

The control values stored in the RAM 40 to define the operation amounts of the actuators are output to the output circuit 80 via the I/O port 70.

The output circuit 80 is provided with a function of the ignition control unit 83 (see FIG. 3) that controls a voltage applied to the ignition plug 200, and is provided with other functions.

[Functional Blocks of Control Device]

Next, a functional configuration of the control device 1 according to the embodiment of the present invention will be described.

Figure 3:
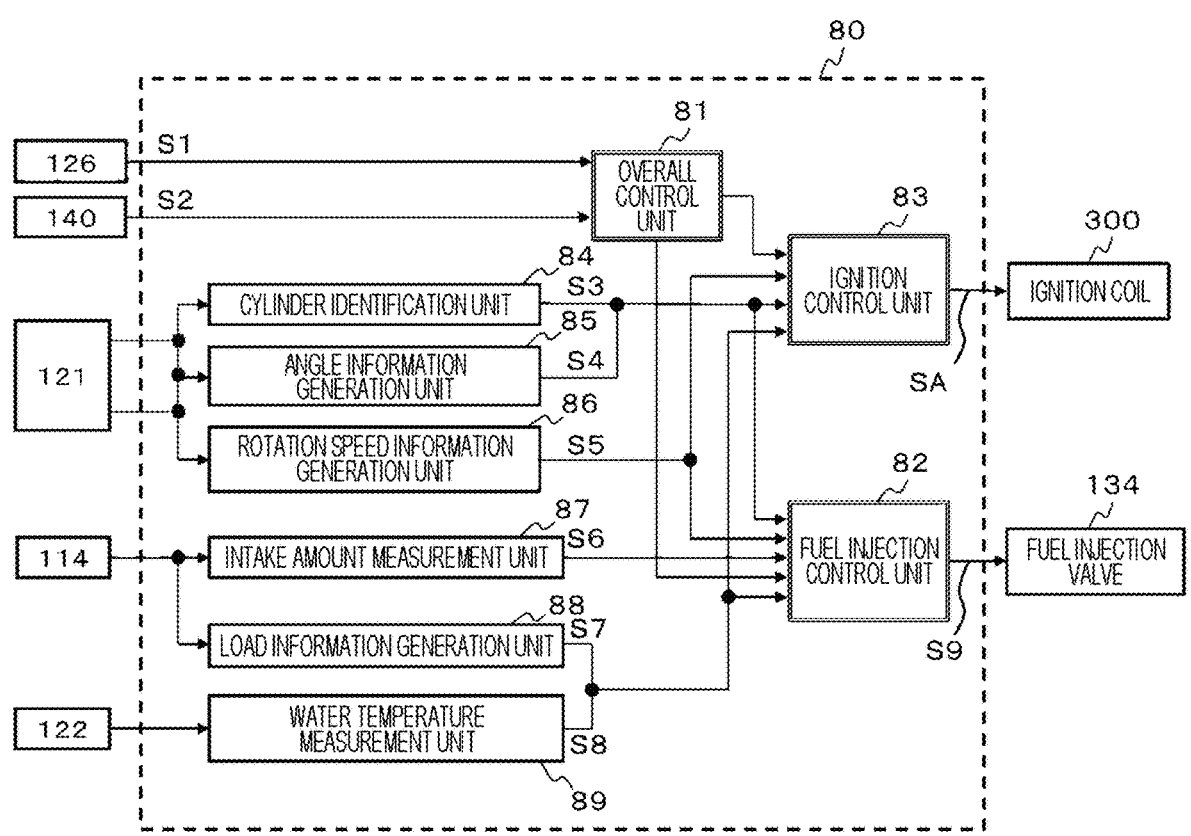
FIG. 3 is a functional block diagram illustrating a functional configuration of the control device according to the embodiment.

FIG. 3 is a functional block diagram illustrating the functional configuration of the control device 1 according to one embodiment of the present invention. For example, the MPU 50 executes the control program stored in the ROM 60, so that each function of the control device 1 is realized by the output circuit 80.

As illustrated in FIG. 3, the output circuit 80 of the control device 1 according to the first embodiment includes an overall control unit 81, a fuel injection control unit 82, and the ignition control unit 83.

The overall control unit 81 is connected to the accelerator position sensor 126 and the combustion pressure sensor (CPS) 140, and receives a required torque (acceleration signal S1) from the accelerator position sensor 126 and an output signal S2 from the combustion pressure sensor 140.

The overall control unit 81 performs overall control of the fuel injection control unit 82 and the ignition control unit 83 on the basis of the required torque (acceleration signal S1) from the accelerator position sensor 126 and the output signal S2 from the combustion pressure sensor 140.

The fuel injection control unit 82 is connected to a cylinder identification unit 84 that identifies each cylinder 150 of the internal combustion engine 100, an angle information generation unit 85 that measures the crank angle of the crankshaft 123, and a rotation speed information generation unit 86 that measures an engine rotation speed. The fuel injection control unit 82 receives a cylinder identification information S3 from the cylinder identification unit 84, a crank angle information S4 from the angle information generation unit 85, and an engine rotation speed information S5 from the rotation speed information generation unit 86.

In addition, the fuel injection control unit 82 is connected to an intake amount measurement unit 87 that measures an intake amount of air taken into the cylinder 150, a load information generation unit 88 that measures an engine load, and a water temperature measurement unit 89 that measures a temperature of engine cooling water. The fuel injection control unit 82 receives intake amount information S6 from the intake amount measurement unit 87, engine load information S7 from the load information generation unit 88, and cooling water temperature information S8 from the water temperature measurement unit 89.

The fuel injection control unit 82 calculates an injection amount and an injection time (fuel injection valve control information S9) of the fuel to be injected from the fuel injection valve 134 on the basis of the received information, and controls the fuel injection valve 134 on the basis of the calculated injection amount and injection time of the fuel.

In addition to the overall control unit 81, the ignition control unit 83 is connected to the cylinder identification unit 84, the angle information generation unit 85, the rotation speed information generation unit 86, the load information generation unit 88, and the water temperature measurement unit 89, and the ignition control unit 83 receives pieces of information from these units.

The ignition control unit 83 calculates, on the basis of the received pieces of information, a current amount (energization angle) of a current supplied to a primary coil (not illustrated) of the ignition coil 300, an energization start time, and a time (ignition time) at which the current supplied to the primary coil is cut off.

The ignition control unit 83 performs control of discharge (ignition control) of the ignition plug 200 by outputting an ignition signal SA to the primary coil of the ignition coil 300 on the basis of the calculated energization angle, energization start time, and ignition time.

At least the function in which the ignition control unit 83 performs the control of ignition of the ignition plug 200 by using the ignition signal SA corresponds to the control device for an internal combustion engine of the present invention.

FIG. 4 is a diagram illustrating a relationship between the operating state of the internal combustion engine 100 and a gas flow velocity around the ignition plug 200. As illustrated in FIG. 4, in general, the higher the engine rotation speed or the load is, the higher the gas flow velocity in the cylinder 150 is; therefore, the gas flow velocity around the ignition plug 200 is accordingly higher. Therefore, the gas flows at a high speed in the space between the center electrode 210 and the outer electrode 220 of the ignition plug 200. Further, in the internal combustion engine 100 in which exhaust gas recirculation (EGR) is performed, an EGR rate is set according to the relationship between the engine rotation speed and the load, for example, as illustrated in FIG. 4. As a high EGR region, in which the EGR rate is set to be higher, is expanded, the consumption of fuel and the exhaust gas can be reduced, but misfire occurs more easily in the ignition plug 200.

FIG. 5 is a diagram illustrating a relationship between a discharge path and a flow velocity in the space between the electrodes of the ignition plug 200.

When a high voltage is generated in a secondary coil of the ignition coil 300 and dielectric breakdown occurs between the center electrode 210 and the outer electrode 220 of the ignition plug 200, the discharge path is formed between the electrodes of the ignition plug 200 until a current flowing in the space between the electrodes becomes less than or equal to a certain value. When a combustible gas comes into contact with the discharge path, a flame core grows and leads to combustion. Since the discharge path is affected by the gas flow in the space between the electrodes and is thereby displaced, the higher the gas flow velocity is, the longer the discharge path is formed in a short time, and the lower the gas flow velocity is, the shorter the discharge path is. FIG. 5(a) illustrates an example of a discharge path 211 when the gas flow velocity is high, and FIG. 5(b) illustrates an example of a discharge path 212 when the gas flow velocity is low.

When the internal combustion engine 100 is operated at a high EGR rate, even if the combustible gas comes into contact with the discharge path, the probability that the flame core grows decreases, and thus it is necessary to increase the opportunity for the combustible gas to come into contact with the discharge path. As described above, since the discharge path is generated by breaking insulation of the gas, if the current necessary to maintain the discharge path is constant, the electric power output corresponding to a length of the discharge path is required. Therefore, in a case where the gas flow velocity is high, it is preferable to obtain a chance to contact with the gas in a wider space by performing energization control of the ignition coil 300 so as to output large electric power from the ignition coil 300 to the ignition plug 200 in a short time, thereby forming the long discharge path 211 as illustrated in FIG. 5 (a). On the other hand, when the gas flow velocity is low, it is preferable to perform the energization control of the ignition coil 300 such that small electric power is continuously output from the ignition coil 300 to the ignition plug 200 for a long time so as to maintain the formation of the short discharge path 212 as illustrated in FIG. 5(b), whereby obtaining for a long time the opportunity that the discharge path is in contact with the gas passing through the vicinity of the electrodes of the ignition plug 200.

[Electric Circuit for Conventional Ignition Coil]

Next, before describing an embodiment of the present invention, a conventional ignition coil will be described.

Figure 6:
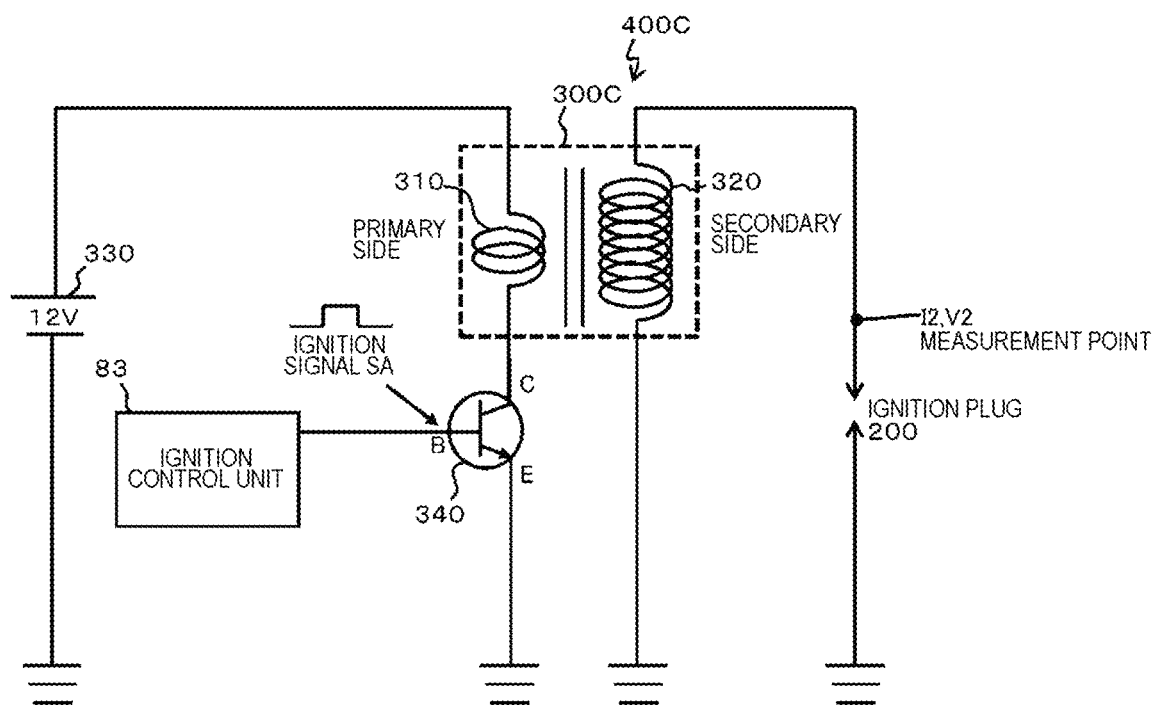
FIG. 6 is a diagram illustrating an electric circuit including a conventional ignition coil.

FIG. 6 is a diagram illustrating an electric circuit 400C including a conventional ignition coil 300C as a comparative example of the present invention. In the electric circuit 400C, the ignition coil 300C includes a primary coil 310 wound with a predetermined number of turns and a secondary coil 320 wound with a greater number of turns than the primary coil 310.

One end of the primary coil 310 is connected to a direct current (DC) power supply 330. With this arrangement, a predetermined voltage (for example, 12 V) is applied to the primary coil 310.

The other end of the primary coil 310 is connected to an igniter 340 and is grounded through the igniter 340. As the igniter 340, a transistor, a field effect transistor (FET), or the like is used.

A base (B) terminal of the igniter 340 is connected to the ignition control unit 83. The ignition signal SA having been output from the ignition control unit 83 is input to the base (B) terminal of the igniter 340. When the ignition signal SA is input to the base (B) terminal of the igniter 340, a section between a collector (C) terminal and an emitter (E) terminal of the igniter 340 becomes in a conductive state, so that a current flows between the collector (C) terminal and the emitter (E) terminal. As a result, the ignition signal SA is output from the ignition control unit 83 to the primary coil 310 of the ignition coil 300 via the igniter 340, and a current flows through the primary coil 310 to accumulate electric power (electric energy).

When the output of the ignition signal SA from the ignition control unit 83 is stopped and the current flowing through the primary coil 310 is therefore cut off, a high voltage corresponding to the turns ratio of the secondary coil 320 with respect to the primary coil 310 is generated in the secondary coil 320.

The high voltage generated in the secondary coil 320 by the ignition signal SA is applied to the ignition plug 200 (center electrode 210), so that a potential difference is generated between the center electrode 210 and the outer electrode 220 of the ignition plug 200. When the potential difference generated between the center electrode 210 and the outer electrode 220 becomes equal to or larger than a dielectric breakdown voltage Vm of the gas (air-fuel mixture in the cylinder 150), the gas component undergoes dielectric breakdown, and a discharge is thus generated between the center electrode 210 and the outer electrode 220, so that the fuel (air-fuel mixture) is ignited (fired).

In the comparative example, the ignition control unit 83 uses the ignition signal SA to control the energization of the ignition coil 300A, owing to the operation of the electric circuit 400C as described. As described above, the ignition control for controlling the ignition plug 200 is performed.

[Discharge Control of Conventional Ignition Coil]

Figure 7:
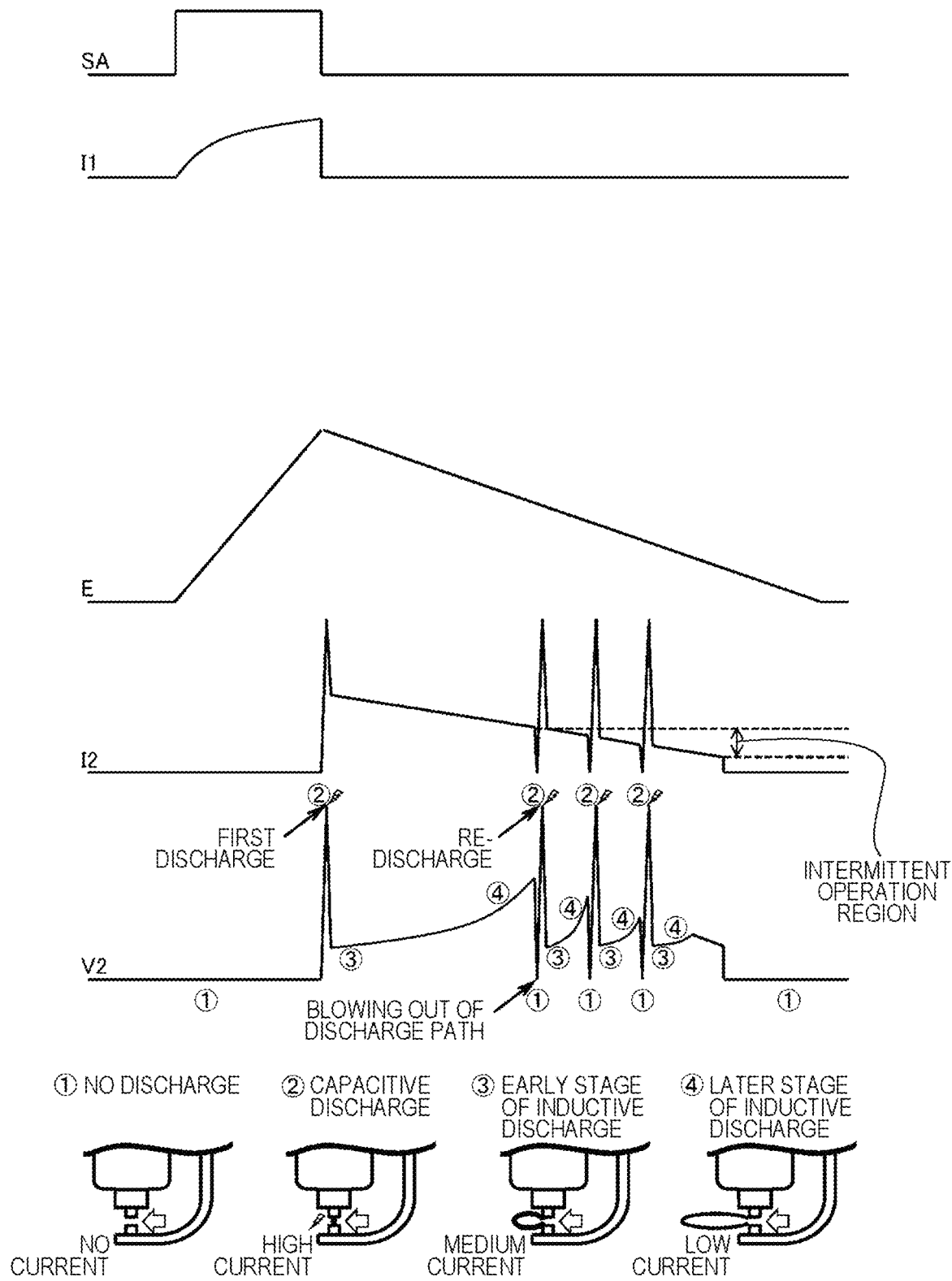
FIG. 7 is a diagram illustrating an example of a timing chart illustrating a relationship between control signals to be input to the ignition coil and outputs in conventional discharge control.

Next, discharge control of the conventional ignition coil will be described. FIG. 7 is a diagram illustrating an example of a timing chart illustrating a relationship between control signals to be input to the ignition coil and outputs in conventional discharge control. The timing chart of FIG. 7 is an example when the conventional ignition coil 300C is used to cause the ignition plug 200 to discharge in the case where the gas has a high flow velocity. FIG. 7 illustrates a relationship between the ignition signal SA output from the ignition control unit 83 and a primary current I1 flowing through the primary coil 310 in response to the ignition signal SA, electric energy E accumulated in the ignition coil 300C, a secondary current I2 flowing through the secondary coil 320, and a secondary voltage V2 generated in the secondary coil 320. Note that a measurement point for the secondary current I2 and the secondary voltage V2 is between the ignition plug 200 and the ignition coil 300C as illustrated in FIG. 6. A measurement point for the primary current I1 is between the DC power supply 330 and the ignition coil 300C.

When the ignition signal SA becomes high, the igniter 340 energizes the primary coil 310, and the primary current I1 increases. During the energization of the primary coil 310, the electric energy E in the ignition coil 300C increases with time.

Thereafter, when the ignition signal SA becomes low, the igniter 340 cuts off the energization of the primary coil 310. As a result, an electromotive force is generated in the secondary coil 320, and the electric energy E from the ignition coil 300C to the ignition plug 200 starts to be supplied. When insulation between the electrodes of the ignition plug 200 is broken, the ignition plug 200 starts to discharge. The discharge of the ignition plug 200 associated with such dielectric breakdown is called a capacitive discharge. After the start of the discharge of the ignition plug 200, the electric energy E in the ignition coil 300C decreases with time, and the discharge of the ignition plug 200 is maintained. The discharge of the ignition plug 200 without such dielectric breakdown is called an inductive discharge.

The secondary current I2 greatly increases at the time of the capacitive discharge. The secondary current I2 due to the capacitive discharge ends in a short time. When the discharge of the ignition plug 200 is started and the discharge path is formed between the electrodes, the secondary current I2 rapidly decreases and then decreases with time during the subsequent inductive discharge. Since the discharge path expands with the flow of the gas, the secondary voltage V2 increases with time. At this time, the magnitude of the secondary current I2 necessary to maintain the discharge path depends on the flow velocity of the gas existing between the electrodes of the ignition plug 200.

When the secondary current I2 is between a minimum value necessary to maintain the discharge path and a maximum value at which discharge cannot be performed, the ignition plug 200 repeats blowing out of the discharge path and re-discharge. A range of the secondary current I2 in which the blowing out of the discharge path and re-discharge are repeated as described above is hereinafter referred to as an "intermittent operation region". That is, when the secondary current I2 enters the intermittent operation region, the discharge path cannot be maintained, and the discharge path is blown out due to the gas flow, so that the discharge of the ignition plug 200 is interrupted. At this time, since the electric energy E in the ignition coil 300C remains even when the discharge path disappears, re-discharge (re-strike) accompanied by the capacitive discharge occurs in the ignition plug 200. In the example of FIG. 7, the first discharge occurs once and the re-discharge occurs three times, and the number of capacitive discharges is four.

When the electric energy E in the ignition coil 300C decreases, the secondary current I2 also decreases accordingly. When the secondary current I2 becomes equal to or less than the maximum value at which the discharge cannot be performed, the discharge of the ignition plug 200 stops. A range of the secondary current I2 in which the discharge of the ignition plug 200 becomes impossible as described above and the ignition plug stops is hereinafter referred to as an "undischargeable region".

In the present invention, instead of the ignition coil 300C described in FIG. 6, the ignition coil 300 having two primary coils is adopted, and discharge control is performed on the ignition coil 300, so that the discharge of the ignition plug 200 is achieved while suppressing the number of capacitive discharges.

First Embodiment: Electric Circuit for Ignition Coil

Next, an electric circuit 400 including an ignition coil 300 according to a first embodiment of the present invention will be described.

Figure 8:
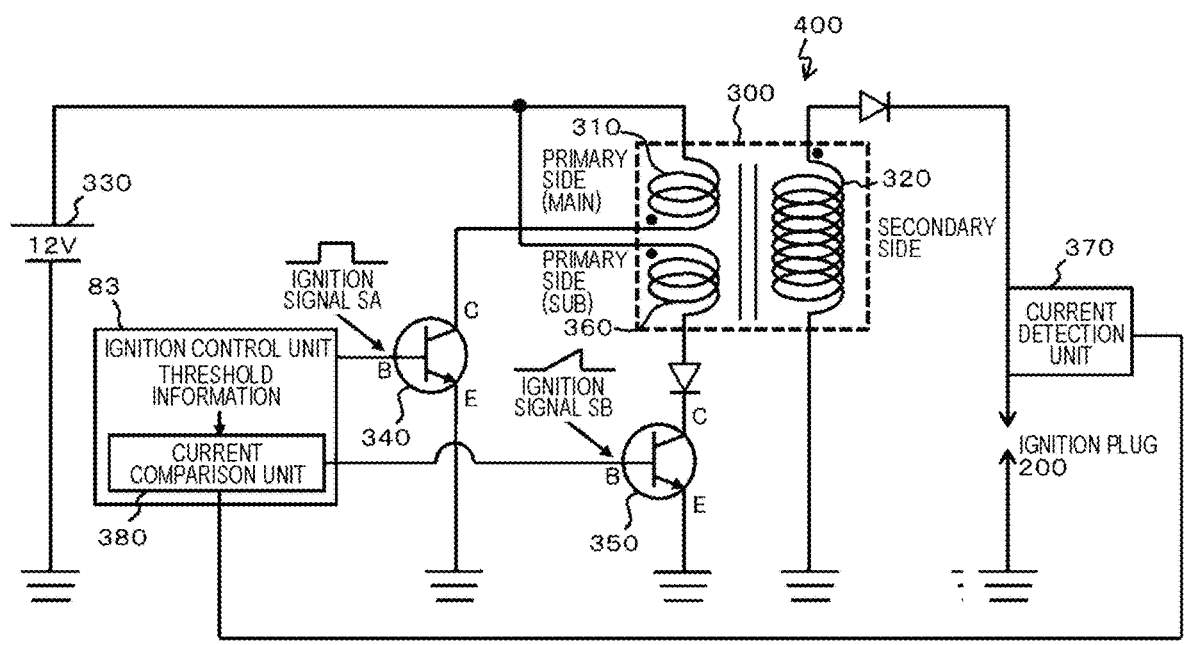
FIG. 8 is a diagram illustrating an electric circuit including an ignition coil according to a first embodiment.

FIG. 8 is a diagram illustrating the electric circuit 400 including the ignition coil 300 according to the first embodiment of the present invention. In the electric circuit 400, the ignition coil 300 includes two types of primary coils 310 and 360 wound with a predetermined number of turns, and a secondary coil 320 wound with a larger number of turns than the primary coils 310 and 360. Here, at the time of ignition of the ignition plug 200, the electric power from the primary coil 310 is first supplied to the secondary coil 320. In superposition with this electric power, the electric power from the primary coil 360 is supplied to the secondary coil 320. Therefore, hereinafter, the primary coil 310 is referred to as a "main primary coil", and the primary coil 360 is referred to as a "sub-primary coil". In addition, the current flowing through the main primary coil 310 is referred to as a "main primary current", and the current flowing through the primary sub-coil 360 is referred to as a "sub-primary current".

One end of the main primary coil 310 is connected to a DC power supply 330. With this assembly, a predetermined voltage (in the embodiment, for example, 12 V) is applied to the main primary coil 310.

The other end of the main primary coil 310 is connected to an igniter 340 and is grounded via the igniter 340. As the igniter 340, a transistor, a field effect transistor (FET), or the like is used.

A base (B) terminal of the igniter 340 is connected to an ignition control unit 83. An ignition signal SA having been output from the ignition control unit 83 is input to the base (B) terminal of the igniter 340. When the ignition signal SA is input to the base (B) terminal of the igniter 340, a section between a collector (C) terminal and an emitter (E) terminal of the igniter 340 becomes in a conductive state, so that a current flows between the collector (C) terminal and the emitter (E) terminal. As a result, the ignition signal SA is output from the ignition control unit 83 to the main primary coil 310 of the ignition coil 300 via the igniter 340, and the main primary current flows through the main primary coil 310 to accumulate electric power (electric energy).

When the output of the ignition signal SA from the ignition control unit 83 is stopped and the main primary current flowing through the main primary coil 310 is thereby cut off, a high voltage corresponding to the turns ratio of the secondary coil 320 with respect to the main primary coil 310 is generated in the secondary coil 320.

One end of the sub-primary coil 360 is connected to the DC power supply 330 in common with the main primary coil 310. With this assembly, the predetermined voltage (in the embodiment, for example, 12 V) is applied also to the sub-primary coil 360.

The other end of the sub-primary coil 360 is connected to an igniter 350 and is grounded via the igniter 350. As the igniter 350, a transistor, a field effect transistor (FET), or the like is used.

A base (B) terminal of the igniter 350 is connected to a current comparison unit 380 provided in the ignition control unit 83. An ignition signal SB having been output from the current comparison unit 380 is input to the base (B) terminal of the igniter 350. When the ignition signal SB is input to the base (B) terminal of the igniter 350, a section between a collector (C) terminal and an emitter (E) terminal of the igniter 350 becomes in a conductive state corresponding to a voltage change of the ignition signal SB, so that a current corresponding to a voltage change of the ignition signal SB flows between the collector (C) terminal and the emitter (E) terminal. As a result, the ignition signal SB is output from the current comparison unit 380 to the sub-primary coil 360 of the ignition coil 300 via the igniter 350, and the sub-primary current flows through the sub-primary coil 360 to generate electric power (electric energy).

When the output of the ignition signal SB from the current comparison unit 380 changes and the sub-primary current flowing through the sub-primary coil 360 accordingly changes, a high voltage corresponding to the turns ratio of the secondary coil 320 with respect to the sub-primary coil 360 is generated in the secondary coil 320.

The high voltage generated in the secondary coil 320 due to the ignition signal SB is added to the high voltage generated in the secondary coil 320 due to the ignition signal SA, and both the voltages are applied to the ignition plug 200 (the center electrode 210), so that a potential difference is generated between the center electrode 210 and the outer electrode 220 of the ignition plug 200. When the potential difference generated between the center electrode 210 and the outer electrode 220 becomes equal to or larger than a dielectric breakdown voltage Vm of the gas (air-fuel mixture in a cylinder 150), the gas component undergoes dielectric breakdown, and a discharge is thus generated between the center electrode 210 and the outer electrode 220, so that the fuel (air-fuel mixture) is ignited (fired).

A current detection unit 370 is provided between the secondary coil 320 and the ignition plug 200 to detect a secondary current flowing through the secondary coil 320. The current detection unit 370 transmits a detected secondary current value to the current comparison unit 380.

The ignition control unit 83 respectively sets, in the current comparison unit 380, a lower limit value of the intermittent operation region (an upper limit value of the undischargeable region) and an upper limit value of the intermittent operation region as a first set value and a second set value that act as thresholds.

The current comparison unit 380 compares the second set value having been set with the secondary current value. When the secondary current value becomes equal to or less than the second set value (the upper limit of the intermittent operation region) after the discharge of the ignition plug 200 is started, the current comparison unit 380 outputs the ignition signal SB to the igniter 350 only for a predetermined period. As a result, the current due to the electric energy from the sub-primary coil 360 is superposed with the secondary current flowing through the secondary coil 320.

Alternatively, the current caused by the main primary coil 310 and flowing through the secondary coil 320 may be estimated, and an output period of the ignition signal SB may be estimated on the basis of the estimated result. Specifically, for example, the sub-primary current caused by the ignition signal SB and flowing through the sub-primary coil 360 is detected or estimated, and the current caused by the sub-primary coil 360 and flowing through the secondary coil 320 in the superposed manner is estimated on the basis of the detected or estimated result and by using the turns ratio between the sub-primary coil 360 and the secondary coil 320. During the output of the ignition signal SB, the secondary current detected by the current detection unit 370 includes the current caused by the main primary coil 310 and the current superposed by the sub-primary coil 360. Therefore, the secondary current output based on the electric energy of the main primary coil 310 can be estimated by subtracting, from the value of the detected secondary current, the estimated current value of the current superposed by the sub-primary coil 360. When the secondary current caused by the main primary coil 310 and estimated as described above becomes equal to or less than the first set value (the upper limit of the undischargeable region), the current comparison unit 380 stops the output of the ignition signal SB to cut off the current superposed by the sub-primary coil 360.

By the operation of the electric circuit 400 as described above, the ignition control unit 83 and the current comparison unit 380 control the energization of the ignition coil 300 by using the ignition signals SA and SB. As described above, the ignition control for controlling the ignition plug 200 is performed.

Note that the current comparison unit 380 may not be provided inside the ignition control unit 83. That is, the ignition control unit 83 and the current comparison unit 380 may be configured separately. In this case, the current comparison unit 380 may be provided inside the ignition coil 300. In any case, since the current comparison unit 380 operates according to the control of the ignition control unit 83, it can be said that the ignition control unit 83 controls the energization of the ignition coil 300.

First Embodiment: Discharge Control of Ignition Coil

Figure 9:
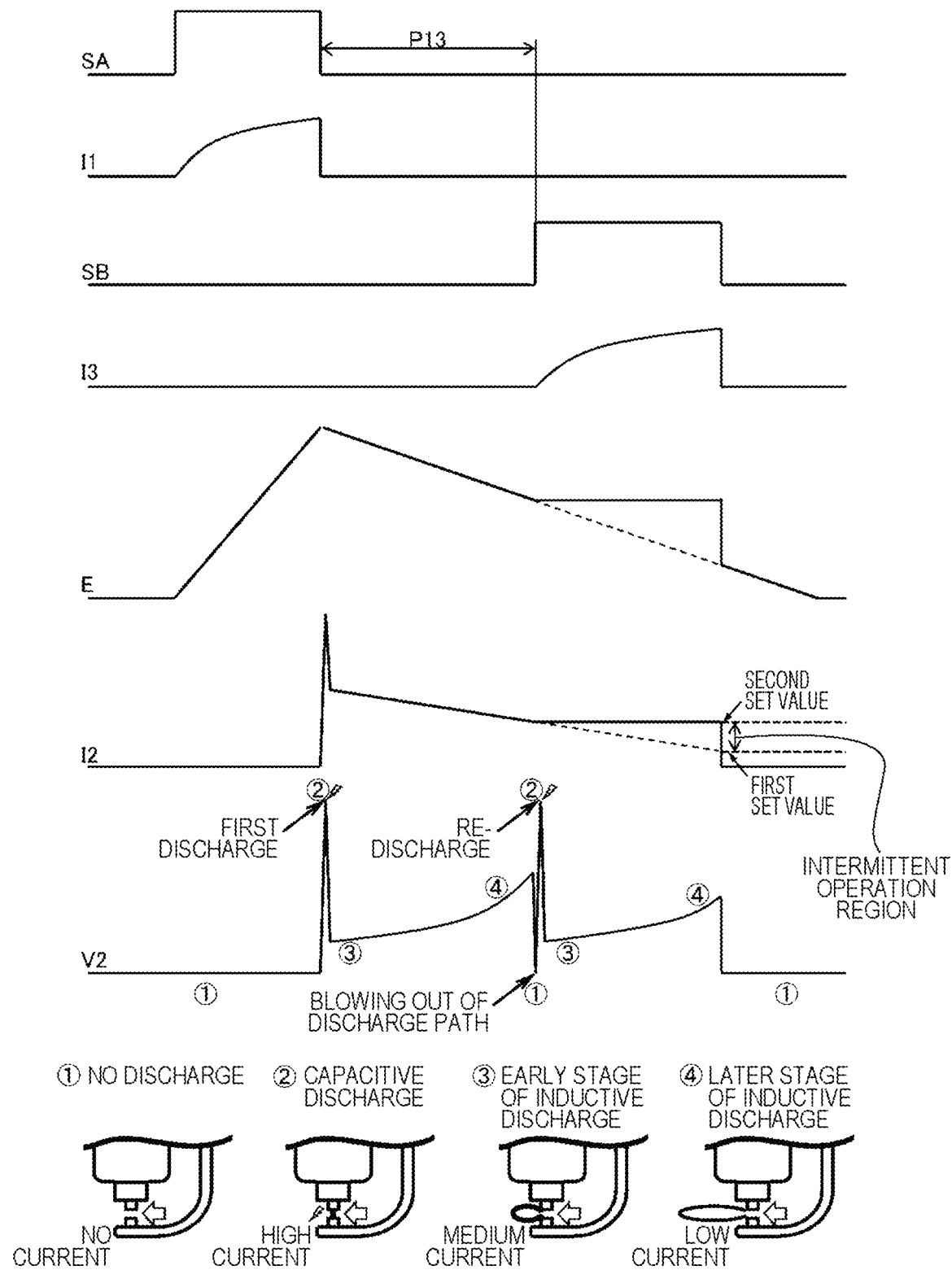
FIG. 9 is a diagram illustrating an example of a timing chart illustrating a relationship between control signals to be input to the ignition coil and outputs in discharge control according to the first embodiment.

Next, the discharge control of the ignition coil according to the first embodiment of the present invention will be described. FIG. 9 is a diagram illustrating an example of a timing chart illustrating a relationship between control signals to be input to the ignition coil and outputs in the discharge control according to the first embodiment of the present invention. The timing chart of FIG. 9 is an example when the ignition coil 300 of the present embodiment is used to cause the ignition plug 200 to discharge in the case where the gas has a high flow velocity. FIG. 9 illustrates a relationship between the ignition signal SA output from the ignition control unit 83, a main primary current I1 flowing through the main primary coil 310 in response to the ignition signal SA, the ignition signal SB output from the current comparison unit 380, and a sub-primary current I3 flowing through the sub-primary coil 360 in response to the ignition signal SB, and electric energy E accumulated in the ignition coil 300, a secondary current I2 flowing through the secondary coil 320, and a secondary voltage V2 generated in the secondary coil 320. As illustrated in FIG. 8, the secondary current I2 and the secondary voltage V2 are detected by the current detection unit 370 provided between the ignition plug 200 and the ignition coil 300. The main primary current I1 and the sub-primary current I3 are estimated by the current comparison unit 380 as described above.

When the ignition signal SA becomes high, the igniter 340 energizes the main primary coil 310, and the main primary current I1 increases. During the energization of the main primary coil 310, the electric energy E in the ignition coil 300 increases with time.

Thereafter, when the ignition signal SA becomes low, the igniter 340 cuts off the energization of the main primary coil 310. As a result, an electromotive force is generated in the secondary coil 320, and the electric energy E starts to be supplied from the ignition coil 300 to the ignition plug 200. When the insulation between the electrodes of the ignition plug 200 is broken, the discharge (capacitive discharge) of the ignition plug 200 is started. After the discharge of the ignition plug 200 is started, the electric energy E in the ignition coil 300 decreases with time, and the discharge (inductive discharge) of the ignition plug 200 is maintained.

The secondary current I2 greatly increases at the time of the capacitive discharge. The secondary current I2 due to the capacitive discharge ends in a short time. When the discharge of the ignition plug 200 is started and a discharge path is formed between the electrodes, the secondary current I2 rapidly decreases and then decreases with time during the subsequent inductive discharge. Since the discharge path expands with the flow of the gas, the secondary voltage V2 increases with time. At this time, the magnitude of the secondary current I2 necessary to maintain the discharge path depends on the flow velocity of the gas existing between the electrodes of the ignition plug 200.

When the secondary current I2 generated by the main primary coil 310 reaches the second set value, in other words, reaches the upper limit value of the intermittent operation region, the current comparison unit 380 outputs the ignition signal SB to the igniter 350.

Hereinafter, a period from when the ignition signal SA becomes low to when the ignition signal SB is output is defined as a period P13.

While the current comparison unit 380 is outputting the ignition signal SB to the igniter 350, the high voltage generated in the secondary coil 320 by the ignition signal SB is added to the high voltage generated in the secondary coil 320 by the ignition signal SA. This high voltage is applied to the ignition plug 200 (center electrode 210). As a result, the secondary current I2 increases, so that the discharge path is continued to be maintained. The secondary current I2 at this time includes a current caused to flow through the secondary coil 320 by the main primary coil 310 (hereinafter, referred to as a "first induced current") and a current caused to flow through the secondary coil 320 by the sub-primary coil 360 (hereinafter, referred to as a "second induced current").

When a predetermined period elapses after the discharge of the ignition plug 200 is started following the turning off of the ignition signal SA, or when the first induced current estimated as described above reaches the first set value, in other words, reaches the upper limit value of the undischargeable region, the current comparison unit 380 turns off the ignition signal SB. At this point of time, the electric energy E accumulated in the ignition coil 300 by the ignition signal SA is sufficiently lowered, and the discharge of the ignition plug 200 becomes impossible only by the output on the ignition coil 300 side. Therefore, the discharge of the ignition plug 200 is terminated simultaneously with the turning off of the ignition signal SB. Therefore, the occurrence of re-discharge (re-strike) accompanied by the capacitive discharge in the ignition plug 200 is suppressed. In the example of FIG. 9, the first discharge occurs once and the re-discharge occurs once, and the number of capacitive discharges is two.

Figure 10:
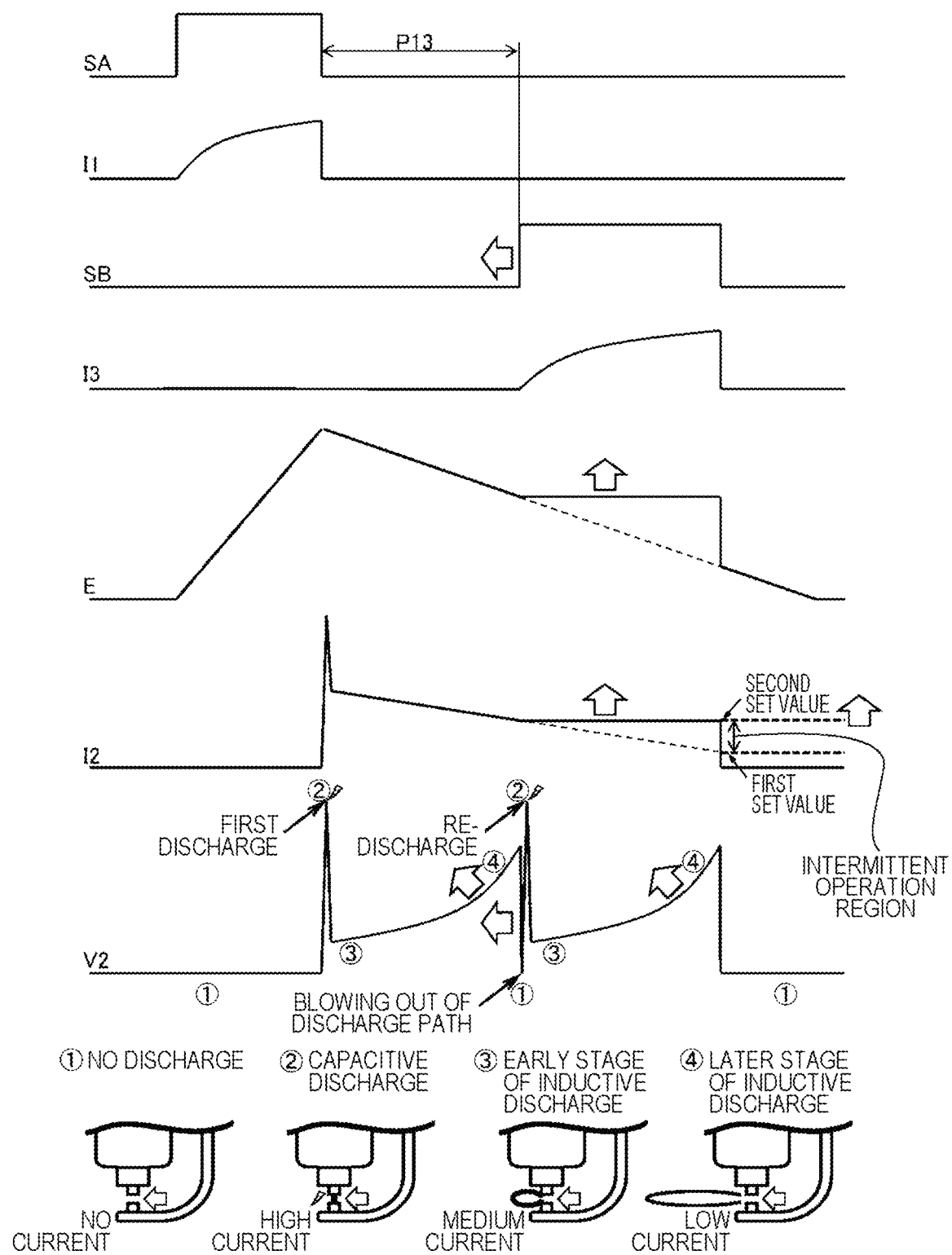
FIG. 10 is a diagram illustrating another example of the timing chart illustrating the relationship between the control signals to be input to the ignition coil and the outputs in the discharge control according to the first embodiment.

FIG. 10 is a diagram illustrating another example of the timing chart illustrating the relationship between the control signals to be input to the ignition coil and the outputs in the discharge control according to the first embodiment of the present invention. The timing chart of FIG. 10 is an example when the ignition coil 300 of the present embodiment is used to discharge the ignition plug 200 in the case where the gas has a higher flow velocity. That is, FIG. 10 illustrates an example of the timing chart in a case where the gas flow velocity changes to be higher than in the case of FIG. 9.

In the example of FIG. 10, a temporal change of the secondary voltage V2 becomes large since the gas flow velocity changes to be higher, so that the intermittent operation region is also expanded. Accordingly, the threshold (second set value) set in the current comparison unit 380 in the ignition control unit 83 increases. It can be understood that a timing of turning on of the ignition signal SB is advanced due to the above-described increase in the threshold and that a pulse width of the ignition signal SB is accordingly expanded.

First Embodiment: Discharge Control Flow of Ignition Coil

Figure 11:
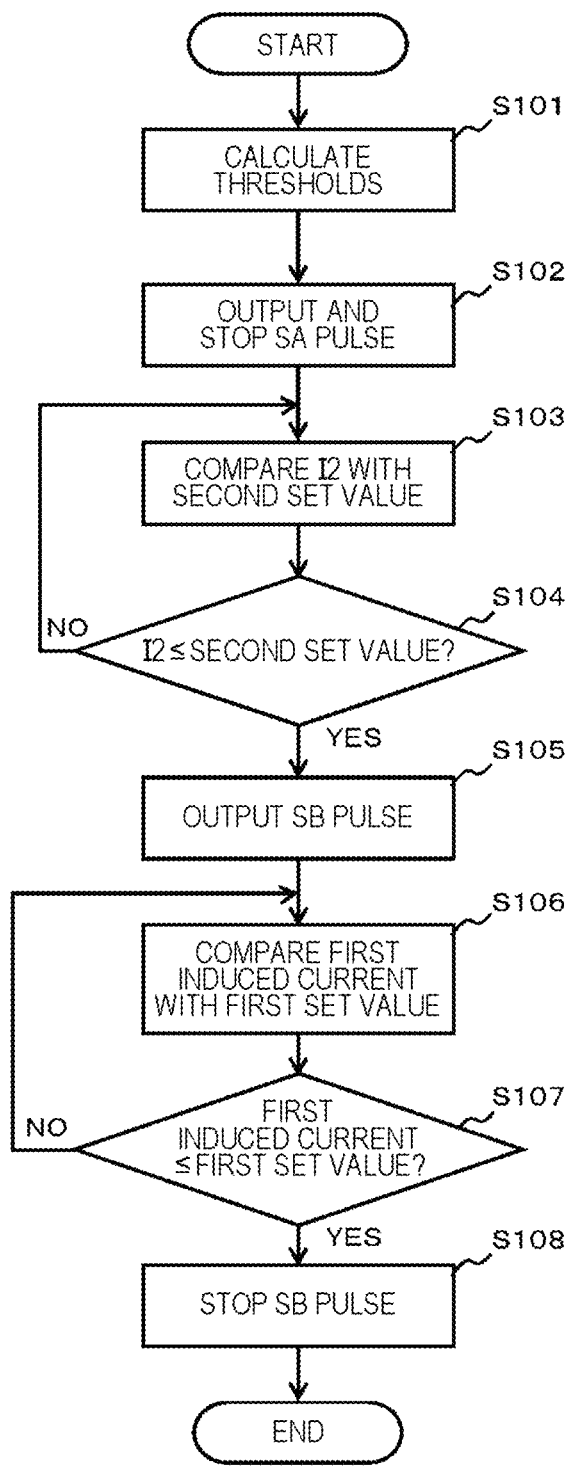
FIG. 11 is an example of a flowchart illustrating a control method of the ignition coil according to the first embodiment.

Next, a description will be given of a control method of the ignition coil 300 by the ignition control unit 83 at the time of performing the above discharge control. FIG. 11 is an example of a flowchart illustrating a control method of the ignition coil 300 by the ignition control unit 83 according to the first embodiment of the present invention. In the present embodiment, when an ignition switch of a vehicle is turned on and a power supply of an internal combustion engine 100 is turned on, the ignition control unit 83 starts the control of the ignition coil 300, following the flowchart of FIG. 11. Note that processing illustrated in the flowchart of FIG. 11 represents processing for one cycle of the internal combustion engine 100, and the ignition control unit 83 performs the processing illustrated in the flowchart of FIG. 11 for each cycle.

In step S101, the ignition control unit 83 detects an operating condition of the internal combustion engine 100. Then, the first set value and the second set value to be set in the current comparison unit 380 are calculated based on the detected operating condition. Specifically, for example, the first set value and the second set value previously determined for each gas flow velocity in the space between the electrodes are stored as map information, and the gas flow velocity in the space between the electrodes estimated from an engine rotation speed and an estimated load is substituted into the map information, whereby the first set value and the second set value corresponding to the current operating state of the internal combustion engine 100 are obtained.

Figure 12A:
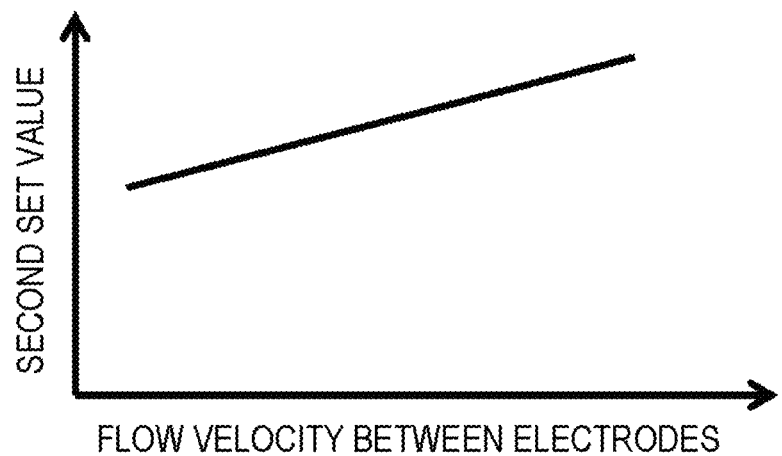
FIGS. 12A and 12B are diagrams illustrating an example of map information representing relationships between a gas flow velocity in a space between electrodes and each of a first set value and a second set value.
Figure 12B:
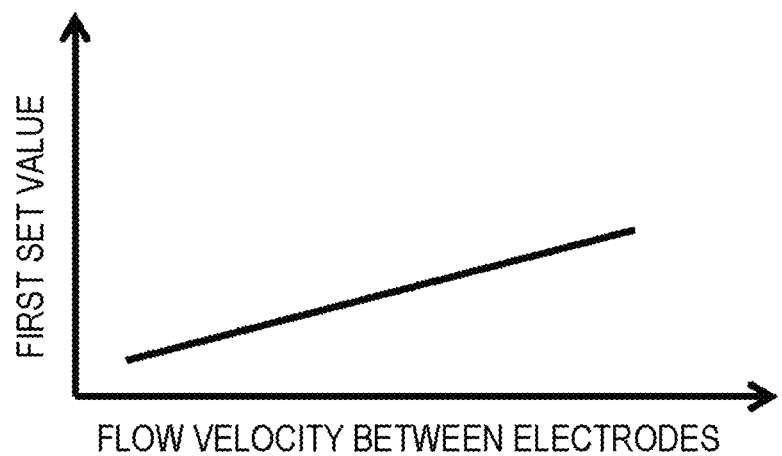

FIG. 12 is a diagram illustrating an example of the map information representing the relationships between the gas flow velocity in the space between the electrodes and each of the first set value and the second set value. FIG. 12(a) illustrates the relationship between the gas flow velocity in the space between the electrodes and the second set value. As illustrated in FIG. 12(a), as the gas flow velocity in the space between the electrodes increases, the re-strike more easily occurs, and thus the second set value needs to be increased. FIG. 12(b) illustrates the relationship between the gas flow velocity in the space between the electrodes and the first set value. As illustrated in FIG. 12(b), as the gas flow velocity in the space between the electrodes increases, the resistance value between the electrodes increases, so that the voltage at which re-discharge can be performed increases. Therefore, it is necessary to increase the first set value.

In the ignition control unit 83, for example, the relationships between the gas flow velocity in the space between the electrodes and each of the first set value and the second set value as illustrated in FIGS. 12(a) and (b) are previously stored as the map information, and the process of step S101 can be performed using these pieces of map information.

In step S102, the ignition control unit 83 starts to output the ignition signal SA at a predetermined timing, and then stops outputting the ignition signal SA at a predetermined timing. As a result, the electric energy E starts to be supplied from the ignition coil 300 to the ignition plug 200, and the ignition plug 200 starts to discharge, so that the secondary current I2 flows through the ignition coil 300.

In step S103, the ignition control unit 83 causes the current comparison unit 380 to compare the secondary current I2 flowing through the ignition coil 300 with the second set value set in step S101. In the present embodiment, the secondary current I2 is detected by the current detection unit 370.

In step S104, the ignition control unit 83 determines whether or not the secondary current I2 was determined, in the comparison in step S103, to be equal to or less than the second set value. When the secondary current I2 is larger than the second set value, the process returns to step S103, and the comparison between the secondary current I2 and the second set value is continued. When the secondary current I2 becomes equal to or less than the second set value, the process proceeds to step S105.

In step S105, the ignition control unit 83 causes the current comparison unit 380 to start to output the ignition signal SB.

In step S106, the ignition control unit 83 causes the current comparison unit 380 to compare the first induced current caused to flow through the secondary coil 320 in the ignition coil 300 by the main primary coil 310 with the first set value set in step S101. Note that the first induced current can be estimated by detecting or estimating, as described above, the sub-primary current flowing through the sub-primary coil 360, by calculating the second induced current on the basis of the turns ratio between the sub-primary coil 360 and the secondary coil 320, and by subtracting the calculated second induced current from the secondary current I2.

In step S107, the ignition control unit 83 determines whether or not the current comparison unit 380 determined, in the comparison in step S106, that the first induced current is equal to or less than the first set value. When the first induced current is larger than the first set value, the process returns to step S106, and the comparison between the first induced current and the first set value is continued. When the first induced current becomes equal to or less than the first set value, the process proceeds to step S108.

In step S108, the ignition control unit 83 stops the output of the ignition signal SB from the current comparison unit 380. When the output of the ignition signal SB is stopped in step S108, the control of the ignition coil 300 according to the flowchart of FIG. 11 is ended.

As described above, in the case where the ignition signal SB is output from the current comparison unit 380 only for a predetermined period, the processes of steps S106 and S107 may be omitted. In this case, the output of the ignition signal SB may be stopped by performing step S108 in a predetermined time after the ignition signal SB starts to be output in step S105.

According to the first embodiment of the present invention described above, the following action and effect are achieved.

(1) A control device 1 for an internal combustion engine includes the ignition control unit 83 that controls energization of the ignition coil 300 that supplies electric energy to the ignition plug 200 that discharges in the cylinder 150 of the internal combustion engine 100 to ignite fuel. The ignition control unit 83 controls energization of the ignition coil 300 such that first electric energy (electric energy caused by the main primary coil 310) is released from the ignition coil 300 and second electric energy (electric energy caused by the sub-primary coil 360) is released in superposition with the first electric energy. At this time, the energization of the ignition coil 200 is controlled such that releasing of the second electric energy is stopped at a timing that depends on a state of gas around the ignition plug 200 so that the discharge of the ignition plug 200 is stopped. With this configuration, it is possible to suppress wearing of electrodes of the ignition plug 300 in the internal combustion engine 100 while reducing failure in ignition of the gas by the ignition plug 200.

(2) The ignition coil 300 includes: the primary coils 310 and 360 disposed on a primary side; and a secondary coil 320 disposed on a secondary side. The ignition control unit 83 controls the energization of the ignition coil 300 such that the first induced current flows through the secondary coil 320 on the basis of primary currents flowing through the primary coils 310 and 360 and such that the second induced current flowing through the secondary coil 320 in superposition with the first induced current is cut off when the first induced current becomes equal to or less than a predetermined first set value (step S107: YES). With this configuration, the second induced current flowing in superposition with the first induced current can be cut off at an appropriate timing.

(3) The first set value is set on the basis of a current value of the secondary coil 320 (secondary current I2) in the undischargeable region in which the ignition plug 200 cannot discharge. With this configuration, it is possible to determine the timing at which the second induced current is cut off so as to reliably suppress the occurrence of the re-strike in the ignition plug 200.

(4) The ignition control unit 83 controls the energization of the ignition coil 300 such that the second induced current starts to flow when the first induced current becomes equal to or less than a predetermined second set value larger than the first set value (step S104: YES). With this configuration, it is possible to appropriately determine the timing at which the second induced current starts to flow in superposition with the first induced current.

(5) The second set value is set on the basis of the current value of the secondary coil 320 (secondary current I2) in the intermittent operation region where the discharge of the ignition plug 200 is interrupted and the re-strike occurs. With this configuration, it is possible to determine the timing at which the second induced current starts to flow so as to reliably suppress the occurrence of the re-strike in the ignition plug 200.

(6) The primary coils 310 and 360 include the main primary coil 310 and the sub-primary coil 360. The ignition control unit 83 controls the energization of the ignition coil 300 such that the energization of the main primary coil 310 is cut off to cause the first induced current to flow through the secondary coil 320. In addition, the energization of the ignition coil 300 is controlled such that the sub-primary coil 360 is energized to cause the second induced current to flow through the secondary coil 320. With this configuration, the main primary coil 310 can be used to flow the first induced current, and the sub-primary coil 360 can be used to cause the second induced current to flow in superposition with the first induced current.

(7) When the first induced current becomes equal to or less than the first set value (step S107: YES), the ignition control unit 83 cuts off the energization of the sub-primary coil 360. With this configuration, it is possible to cut off, at an appropriate timing, the second induced current that is caused by the sub-primary coil 360 and flows in superposition with the first induced current.

Second Embodiment: Electric Circuit for Ignition Coil

Next, an electric circuit 400A including an ignition coil 300 according to a second embodiment of the present invention will be described.

Figure 13:
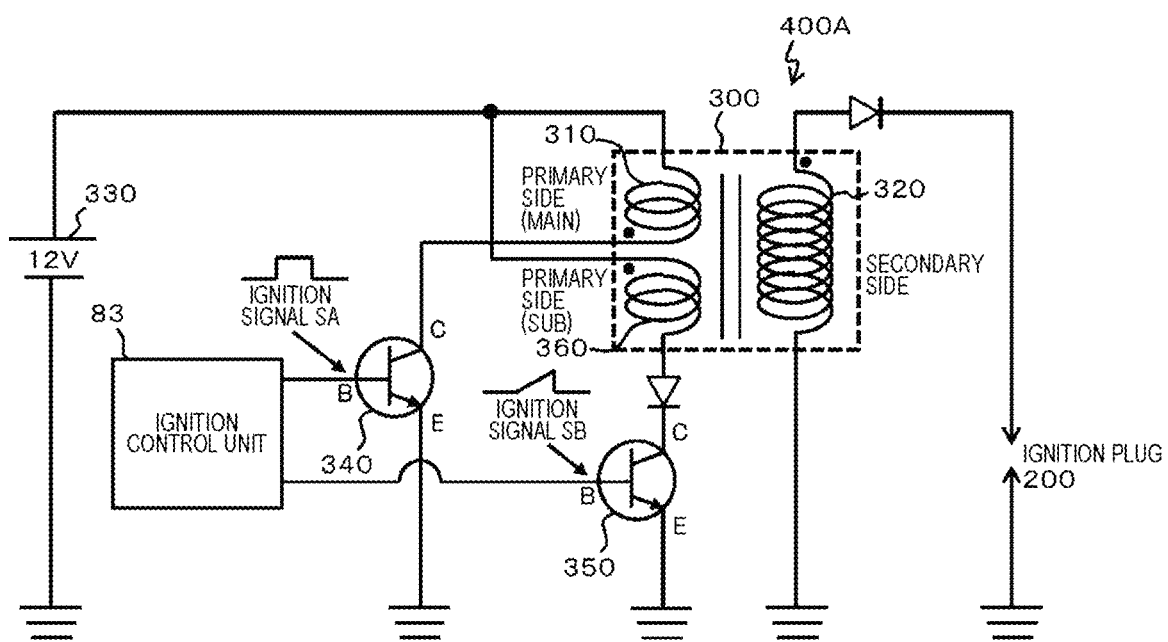
FIG. 13 is a diagram illustrating an electric circuit including an ignition coil according to a second embodiment.

FIG. 13 is a diagram illustrating the electric circuit 400A including the ignition coil 300 according to the second embodiment of the present invention. In the present embodiment, the ignition coil 300 has the same configuration as that of FIG. 8 described in the first embodiment. That is, the ignition coil 300 of the present embodiment also includes two types of primary coils 310 and 360 (main primary coil 310 and sub-primary coil 360) wound with a predetermined number of turns and a secondary coil 320 wound with a greater number of turns than the primary coils 310 and 360.

In the present embodiment, the electric circuit 400A is different from the electric circuit 400 described in the first embodiment in that the current detection unit 370 and the current comparison unit 380 are omitted. In the present embodiment, a base (B) terminal of an igniter 350 is connected to an ignition control unit 83. The ignition control unit 83 outputs an ignition signal SB to the base (B) terminal of the igniter 350. With this arrangement, similarly to the first embodiment, a sub-primary current flows through the sub-primary coil 360, and electric power (electric energy) is generated.

In the present embodiment, an on timing and an off timing of the ignition signal SB are set by the ignition control unit 83 to predetermined timings corresponding to an operating state of an internal combustion engine 100 by taking the off timing of the ignition signal SA as a starting point.

The ignition control unit 83 controls the energization of the ignition coil 300 using the ignition signals SA and SB by the operation of the electric circuit 400A as described above. As described above, ignition control for controlling the ignition plug 200 is performed.

Second Embodiment: Discharge Control Flow of Ignition Coil

Figure 14:
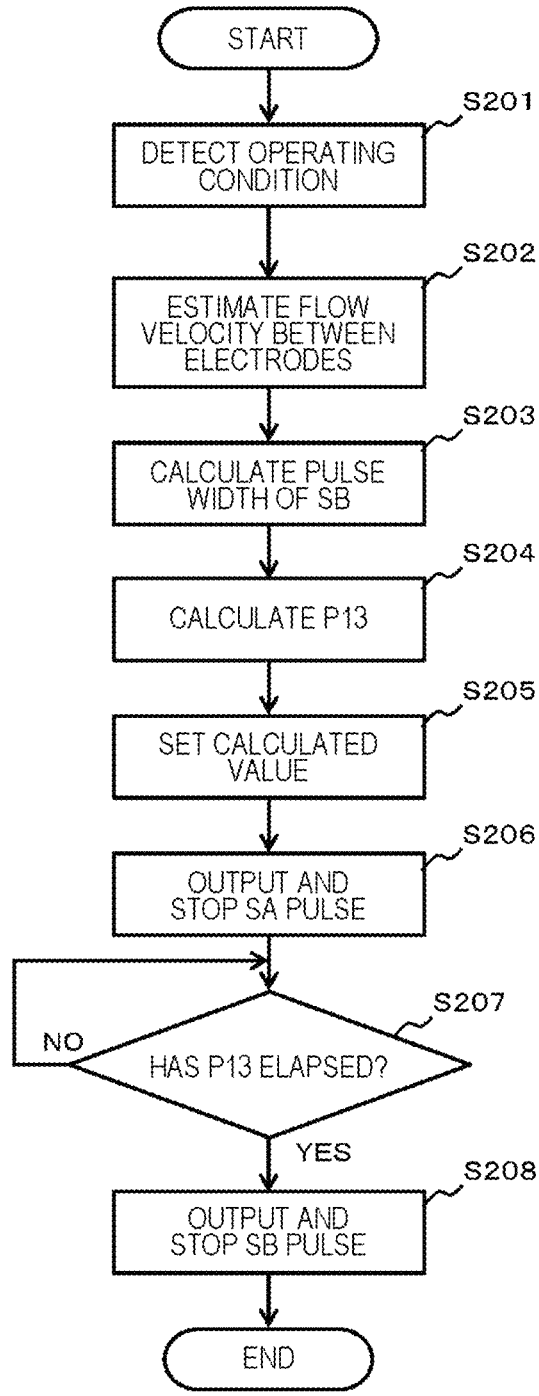
FIG. 14 is an example of a flowchart illustrating a control method of the ignition coil according to the second embodiment.

Next, a description will be given of a method of controlling the ignition coil 300 by the ignition control unit when performing discharge control of the ignition coil according to the second embodiment of the present invention. FIG. 14 is an example of a flowchart illustrating the method of controlling the ignition coil 300 by the ignition control unit 83 according to the second embodiment of the present invention. In the present embodiment, when an ignition switch of a vehicle is turned on and a power supply of the internal combustion engine 100 is turned on, the ignition control unit 83 starts the control of the ignition coil 300, following the flowchart of FIG. 14. Note that processing illustrated in the flowchart of FIG. 14 represents processing for one cycle of the internal combustion engine 100, and the ignition control unit 83 performs the processing illustrated in the flowchart of FIG. 14 for each cycle.

In step S201, the ignition control unit 83 detects an operating condition of the internal combustion engine 100.

In step S202, the ignition control unit 83 estimates a gas flow velocity in the space between electrodes on the basis of the operating condition detected in step S201. Specifically, a value of the gas flow velocity in a space between the electrodes is obtained by substituting an engine rotation speed and an estimated load detected in step S201 into a map of the gas flow velocity previously determined for each operating condition.

In step S203, the ignition control unit 83 calculates a pulse width of the ignition signal SB. Specifically, for example, the pulse width of the ignition signal SB previously determined for each gas flow velocity in the space between the electrodes is stored as map information, and the gas flow velocity estimated in step S202 is substituted into the map information, so that the pulse width of the ignition signal SB is obtained according to the current operating state of the internal combustion engine 100.

Figure 15:
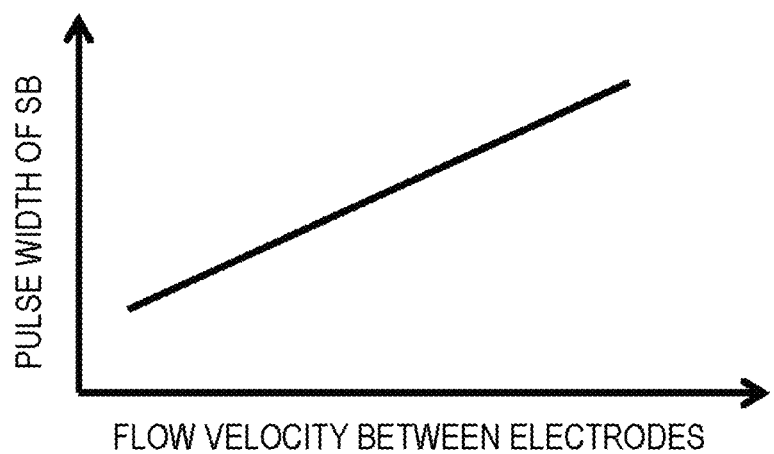
FIG. 15 is a diagram illustrating an example of map information representing a relationship between a gas flow velocity in a space between electrodes and a pulse width of an ignition signal.

FIG. 15 is a diagram illustrating an example of the map information representing a relationship between the gas flow velocity in the space between the electrodes and the pulse width of the ignition signal SB. When the gas flow velocity in the space between the electrodes of the ignition plug 200 increases, a temporal change in a secondary voltage V2 increases, so that an intermittent operation region become expanded. Therefore, it is necessary to accordingly expand the pulse width of the ignition signal SB as illustrated in FIG. 15.

In the ignition control unit 83, for example, the relationship between the gas flow velocity in the space between the electrodes and the pulse width of the ignition signal SB as illustrated in FIG. 15 is previously stored as the map information, and the process of step S203 can be performed using the map information.

With reference again to FIG. 14, in step S204, the ignition control unit 83 calculates a period P13 from when the ignition signal SA becomes low to when the ignition signal SB is output. Specifically, for example, a value of the period P13 previously determined for each gas flow velocity in the space between the electrodes is stored as map information, and the gas flow velocity estimated in step S202 is substituted into the map information, so that the period P13 is obtained according to the current operating state of the internal combustion engine 100.

Figure 16:
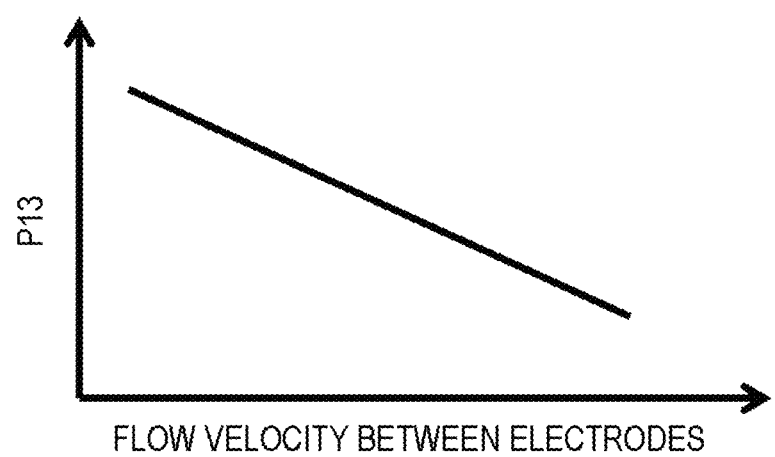
FIG. 16 is a diagram illustrating an example of map information representing a relationship between a gas flow velocity in a space between electrodes and a period until an ignition signal starts to be output.

FIG. 16 is a diagram illustrating an example of map information indicating a relationship between the gas flow velocity in the space between the electrodes and the period P13 from when the ignition signal SA becomes low to when the ignition signal SB is output. When the gas flow velocity in the space between the electrodes of the ignition plug 200 increases, a temporal change in the secondary voltage V2 increases, so that the intermittent operation region become expanded. Therefore, it is necessary to accordingly shorten the period P13 to advance an axis of turning on of the ignition signal SB as illustrated in FIG. 15.

In the ignition control unit 83, for example, the relationship between the gas flow velocity in the space between the electrodes and the period P13 until the ignition signal SB starts to be output is previously stored as the map information as illustrated in FIG. 16, and the process of step S204 can be performed using the map information.

With reference again to FIG. 14, in step S205, the ignition control unit 83 sets each of the pulse width of the ignition signal SB calculated in step S203 and the period P13 until the ignition signal SB calculated in step S204 starts to be output. Specifically, for example, these calculated values are stored in a storage area (not shown) provided in the ignition control unit 83, so that these calculated values are reflected in the process of step S206 and subsequent steps.

In step S206, the ignition control unit 83 starts to output the ignition signal SA at a predetermined timing, and then stops outputting the ignition signal SA at a predetermined timing. As a result, the electric energy E starts to be supplied from the ignition coil 300 to the ignition plug 200, and the ignition plug 200 starts to discharge, so that the secondary current I2 flows through the ignition coil 300.

In step S207, the ignition control unit 83 determines whether or not an elapsed time from when the output of the ignition signal SA is stopped in step S206 has reached the period P13 set in step S205. When the elapsed time from when the output of the ignition signal SA is stopped has not exceeded the period P13, the process remains in step S207, and when the elapsed time has exceeded the period P13, the process proceeds to step S208.

In step S208, the ignition control unit 83 outputs the ignition signal SB having the pulse width set in step S205. In other words, when the period of the set pulse width has elapsed after the ignition signal SB starts to be output, the output of the ignition signal SB is stopped. When the output of the ignition signal SB is stopped in step S208, the control of the ignition coil 300 according to the flowchart of FIG. 14 is ended.

With the above-described second embodiment of the present invention, the ignition control unit 83 controls the energization of the ignition coil 300 such that first electric energy (electric energy caused by the main primary coil 310) is released from the ignition coil 300 and second electric energy (electric energy caused by the sub-primary coil 360) is released in superposition with the first electric energy. At this time, the energization of the ignition coil 300 is controlled such that releasing of the second electric energy is stopped at a timing that depends on a state of gas around the ignition plug 200 so that the discharge of the ignition plug 200 is stopped. With this configuration, similarly to the first embodiment, it is possible to suppress wearing of electrodes of the ignition plug 200 in the internal combustion engine 100 while reducing failure in ignition of the gas by the ignition plug 200.

Third Embodiment

Next, a third embodiment of the present invention will be described. In the present embodiment, a description will be given of a method of confirming an operation of an ignition control unit 83 will be described.

Figure 17:
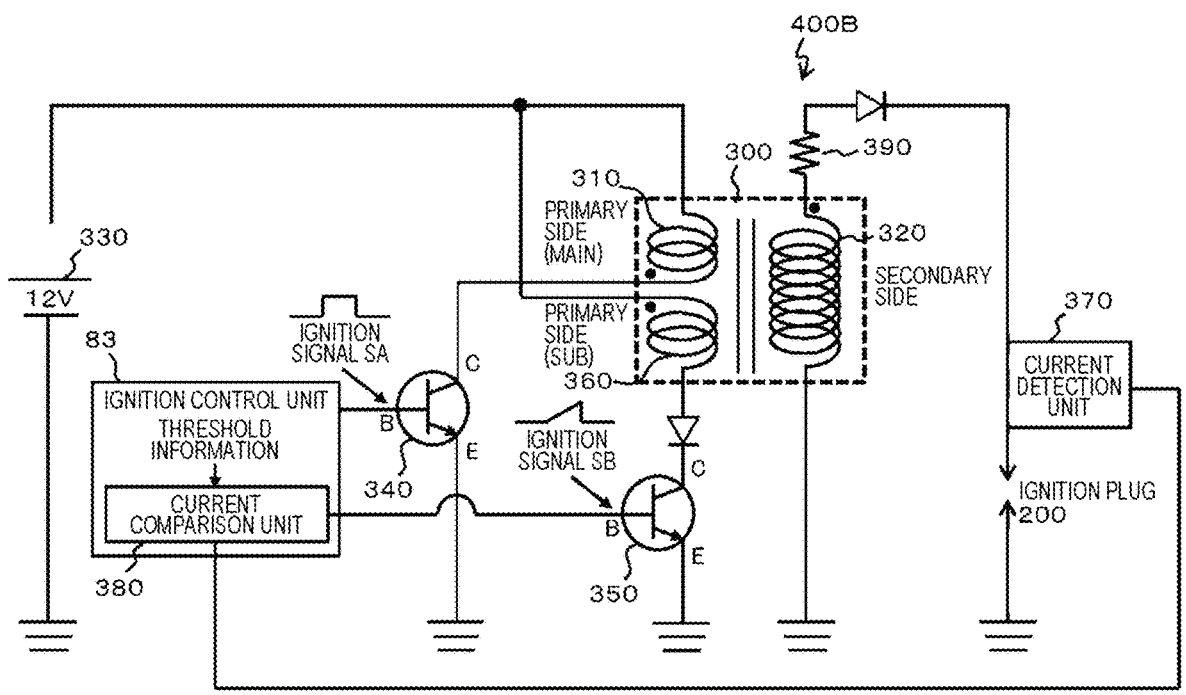
FIG. 17 is a diagram for describing an electric circuit including an ignition coil according to a third embodiment.

FIG. 17 is a diagram illustrating an electric circuit 400B including an ignition coil 300 according to the third embodiment of the present invention. In the present embodiment, the electric circuit 400B is different from the electric circuit 400 described in the first embodiment in that a resistor 390 for preventing noise is connected between the ignition coil 300 and an ignition plug 200. Note that the resistor 390 may be connected anywhere as long as it is connected in series with the ignition plug 200.

In the present embodiment, the ignition control unit 83 performs the same operation as that described in the first embodiment. In other words, the ignition control unit 83 includes a current comparison unit 380, outputs an ignition signal SA, and uses the current comparison unit 380 to output an ignition signal SB. With this configuration, the energization of the ignition coil 300 is controlled such that a first induced current flows through a secondary coil 320 on the basis of a main primary current flowing through a main primary coil 310 and such that when the first induced current becomes equal to or less than a second set value corresponding to an upper limit of an intermittent operation region, the second induced current flows, in superposition with the first induced current, through the secondary coil 320 on the basis of a sub-primary current flowing through the sub-primary coil 310. In addition, when the first induced current becomes equal to or less than a first set value corresponding to an upper limit of an undischargeable region, the energization of the ignition coil 300 is controlled so as to cut off the second induced current.

In the present embodiment, the operation of the ignition control unit 83 can be confirmed as follows. First, the resistor 390 is set to a predetermined resistance value, an internal combustion engine 100 is operated, and the ignition signals SA and SB are then output from the ignition control unit 83 to discharge the ignition plug 200. Then, a temporal change of a secondary current I2 at this time is measured.

Next, a decreasing speed of the secondary current I2 is changed by setting the resistance value of the resistor 390 to a value different from the above value. In this state, the internal combustion engine 100 is operated, and the ignition signals SA and SB are then output from the ignition control unit 83 to discharge the ignition plug 200. Then, a temporal change of the secondary current I2 at this time is measured.

As described above, the temporal changes of the secondary current I2 measured with different resistance values are measured, and these measurement results are compared. As a result, if the current value when, in the secondary current I2, a current component caused to flow by the ignition signal SB, in other words, the second induced current flowing through the secondary coil 320 in superposition with the first induced current is cut off is constant regardless of the change in the resistance value of the resistor 390, it confirms that the ignition control unit 83 determines, based on the above-described first set value, the timing at which the output of the ignition signal SB is stopped. That is, it can be seen that the ignition control unit 83 changes, in response to the change in the resistance value of the resistor 390, the timing at which the second induced current is cut off, such that the current of the ignition plug 200 when the second induced current is cut off is constant. Therefore, it is confirmed that the ignition control unit 83 is performing a desired operation.

In addition, if the current value when, in the secondary current I2, the ignition signal SB causes the second induced current to start to flow in the secondary coil 320 in superposition with the first induced current, is constant regardless of the change in the resistance value of the resistor 390, it confirms by a similar method that the ignition control unit 83 determines, based on the above-described second set value, the timing at which the output of the ignition signal SB starts to be output. That is, it can be seen that the ignition control unit 83 changes, in response to the change in the resistance value of the resistor 390, the timing at which the second induced current starts to flow such that the current of the ignition plug 200 when the second induced current starts to flow is constant. Therefore, it is confirmed that the ignition control unit 83 is performing a desired operation.

In the present embodiment, the operation of the ignition control unit 83 can be confirmed by the above-described method.

Note that, in the third embodiment described above, the description has been given of an example of the case where the operation of the ignition control unit 83 described in the first embodiment is confirmed using the electric circuit 400B in which the resistor 390 is added to the electric circuit 400 described in the first embodiment. However, also in the case of the second embodiment, the operation of the ignition control unit 83 can be confirmed by a similar method. Specifically, if the resistor 390 is added to the electric circuit 400A described in the second embodiment, it is possible to confirm that the ignition control unit 83 is performing a desired operation, by using a method as described above.

According to the above-described third embodiment of the present invention, the resistor 390 having a predetermined resistance value is connected between the secondary coil 320 and the ignition plug 200. The ignition control unit 83 changes, in response to the change in the resistance value of the resistor 390, the timing at which the second induced current is cut off such that the current of the ignition plug 200 when the second induced current is cut off is constant. Further, the ignition control unit 83 changes, in response to the change in the resistance value of the resistor 390, the timing at which the second induced current starts to flow, such that the current of the ignition plug 200 when the second induced current starts to flow is constant. With this configuration, it is possible to confirm that the ignition control unit 83 is performing a desired operation.

In each of the embodiments described above, each functional configuration of the control device 1 described with reference to FIG. 3 may be implemented by software executed by the MPU 50 as described above, or may be implemented by hardware such as a field-programmable gate array (FPGA). In addition, these may be used in a mixed manner.

The embodiments and various variations described above are merely examples, and the present invention is not limited to these contents as long as the features of the invention are not impaired. Although various embodiments and variations have been described above, the present invention is not limited to these contents. Other aspects conceivable within the scope of the technical idea of the present invention are also included within the scope of the present invention.

REFERENCE SIGNS LIST

1 control device
10 analog input unit
20 digital input unit
30 A/D converter
40 RAM
50 MPU
60 ROM
70 I/O port
80 output circuit
81 overall control unit
82 fuel injection control unit
83 ignition control unit
84 cylinder identification unit
85 angle information generation unit
86 rotation speed information generation unit
87 intake amount measurement unit
88 load information generation unit
89 water temperature measurement unit
100 internal combustion engine
110 air cleaner
111 intake pipe
112 intake manifold
113 throttle valve
113a throttle opening sensor
114 flow sensor
115 intake air temperature sensor
120 ring gear
121 crank angle sensor
122 water temperature sensor
123 crankshaft
125 accelerator pedal
126 accelerator position sensor
130 fuel tank
131 fuel pump
132 pressure regulator
133 fuel pipe
134 fuel injection valve
140 combustion pressure sensor
150 cylinder
151 intake valve
152 exhaust valve
160 exhaust manifold
161 three-way catalyst
162 upstream air-fuel ratio sensor
163 downstream air-fuel ratio sensor
170 piston
200 ignition plug
210 center electrode
220 outer electrode
230 insulator
300, 300C ignition coil
310 main primary coil
320 secondary coil
330 DC power supply
340, 350 igniter
360 sub-primary coil
370 current detection unit
380 current comparison unit
390 resistor
400, 400A, 400B, 400C electric circuit

The invention claimed is:

1. A control device for an internal combustion engine, comprising
an ignition control unit that controls energization of an ignition coil that supplies electric energy to an ignition plug that discharges in a cylinder of the internal combustion engine to ignite fuel,
wherein the ignition coil includes a primary coil disposed on a primary side, and a secondary coil disposed on a secondary side, and
wherein the ignition control unit
controls the energization of the ignition coil such that, by a first induced current flowing through the secondary coil and a second induced current flowing through the secondary coil in superposition with the first induced current based on a primary current flowing through the primary coil, the ignition coil releases first electric energy and, in addition, releases second electric energy in superposition with the first electric energy; and controls the energization of the ignition coil such that, by the second induced current being cut off when the first induced current becomes equal to or less than a predetermined first set value, the ignition coil stops the releasing of the second electric energy at a timing depending on a state of a gas around the ignition plug to stop the discharge of the ignition plug.

2. The control device for an internal combustion engine according to claim 1, wherein the first set value is set based on a current value of the secondary coil in an undischargeable region in which the ignition plug is unable to discharge.

3. The control device for an internal combustion engine according to claim 1, wherein the ignition control unit controls the energization of the ignition coil such that the second induced current starts to flow when the first induced current becomes equal to or less than a predetermined second set value larger than the first set value.

4. The control device for an internal combustion engine according to claim 3, wherein the second set value is set based on a current value of the secondary coil in an intermittent operation region in which discharge of the ignition plug is interrupted and a re-strike occurs.

5. The control device for an internal combustion engine according to claim 1, wherein
the primary coil includes a main primary coil and a sub-primary coil, and
the ignition control unit
controls the energization of the ignition coil such that energization of the main primary coil is cut off to cause the first induced current to flow through the secondary coil, and
controls the energization of the ignition coil such that the sub-primary coil is energized to cause the second induced current to flow through the secondary coil.

6. The control device for an internal combustion engine according to claim 5, wherein the ignition control unit cuts off the energization of the sub-primary coil when the first induced current becomes equal to or less than the first set value.

7. The control device for an internal combustion engine according to claim 1, wherein
a resistor having a predetermined resistance value is connected between the secondary coil and the ignition plug, and
the ignition control unit changes, in response to a change in the resistance value, a timing at which the second induced current is cut off such that a current of the ignition plug when the second induced current is cut off is constant.

8. The control device for an internal combustion engine according to claim 1, wherein
a resistor having a predetermined resistance value is connected between the secondary coil and the ignition plug, and
the ignition control unit changes, in response to a change in the resistance value, a timing at which the second induced current starts to flow such that a current of the ignition plug when the second induced current starts to flow is constant.

* * * * *